(12) United States Patent
Beauchemin et al.

(10) Patent No.: US 10,604,031 B2
(45) Date of Patent: Mar. 31, 2020

(54) VEHICLE WITH ADJUSTABLE SEATS AND SEAT BELT ASSEMBLIES

(71) Applicant: BOMBARDIER RECREATIONAL PRODUCTS INC., Valcourt (CA)

(72) Inventors: Robin Beauchemin, St-Denis-de-Brompton (CA); Gabriel Provost, Shefford (CA); Jean Guillemette, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 30 days.

(21) Appl. No.: 15/656,261

(22) Filed: Jul. 21, 2017

(65) Prior Publication Data

US 2018/0029558 A1 Feb. 1, 2018

Related U.S. Application Data

(60) Provisional application No. 62/367,779, filed on Jul. 28, 2016, provisional application No. 62/371,441, filed on Aug. 5, 2016.

(51) Int. Cl.
*B60N 2/07* (2006.01)
*B60N 2/24* (2006.01)
(Continued)

(52) U.S. Cl.
CPC ............ *B60N 2/0722* (2013.01); *B60N 2/07* (2013.01); *B60N 2/0717* (2013.01);
(Continued)

(58) Field of Classification Search
CPC . B60R 22/22; B60R 22/20; B60R 2022/1812; B60R 2022/1806; B60R 2022/1818; B60N 2/07; B60N 2/80
See application file for complete search history.

(56) References Cited

U.S. PATENT DOCUMENTS

| 1,822,427 A | 9/1931 | Wenn et al. |
| 2,277,927 A | 3/1942 | McGregor |

(Continued)

FOREIGN PATENT DOCUMENTS

| GB | 585196 A | 1/1947 |

OTHER PUBLICATIONS

International Search Report of PCT/IB2017/054444; Blaine R. Copenheaver; dated Nov. 17, 2017.

*Primary Examiner* — Darlene P Condra
(74) *Attorney, Agent, or Firm* — BCF LLP

(57) ABSTRACT

A vehicle includes a frame; a plurality of ground engaging members; a motor; and at least one seat connected to the frame and being translatable between at least a forward position and a rearward position. The seat includes a seat body defining a belt aperture and a buckle aperture; and a seat belt assembly connected to the frame and including a seat belt extending through the belt aperture and having an end connected to the frame, a male buckle connector slidably connected to the seat belt, and a female buckle receptacle for receiving the male buckle connector, the female buckle receptacle extending through the buckle aperture and having an end connected to the frame, the seat belt assembly being operable with the seat when the seat is in at least both of the forward position and the rearward position.

20 Claims, 32 Drawing Sheets

(51) Int. Cl.
  *B60R 22/18* (2006.01)
  *B60R 22/24* (2006.01)
  *B60R 22/20* (2006.01)
  *B60R 22/22* (2006.01)
  *B60N 2/08* (2006.01)
  *B60N 2/38* (2006.01)

(52) U.S. Cl.
  CPC ............ *B60N 2/0806* (2013.01); *B60N 2/24* (2013.01); *B60N 2/38* (2013.01); *B60R 22/18* (2013.01); *B60R 22/20* (2013.01); *B60R 22/22* (2013.01); *B60R 22/24* (2013.01); *B60R 2022/1806* (2013.01); *B60R 2022/1812* (2013.01); *B60R 2022/1818* (2013.01)

(56) References Cited

U.S. PATENT DOCUMENTS

| | | | | |
|---|---|---|---|---|
| 3,727,977 | A * | 4/1973 | Gmeiner | B60R 22/26 297/344.1 |
| 4,432,524 | A | 2/1984 | Wize | |
| 6,000,757 | A | 12/1999 | Sovis | |
| 2012/0175930 | A1* | 7/2012 | Jovicevic | B60N 2/12 297/331 |
| 2016/0221624 | A1* | 8/2016 | Lang | B60N 2/68 |
| 2016/0257283 | A1* | 9/2016 | Muto | B60R 22/26 |
| 2016/0280094 | A1* | 9/2016 | Frye | B60N 2/0244 |

\* cited by examiner

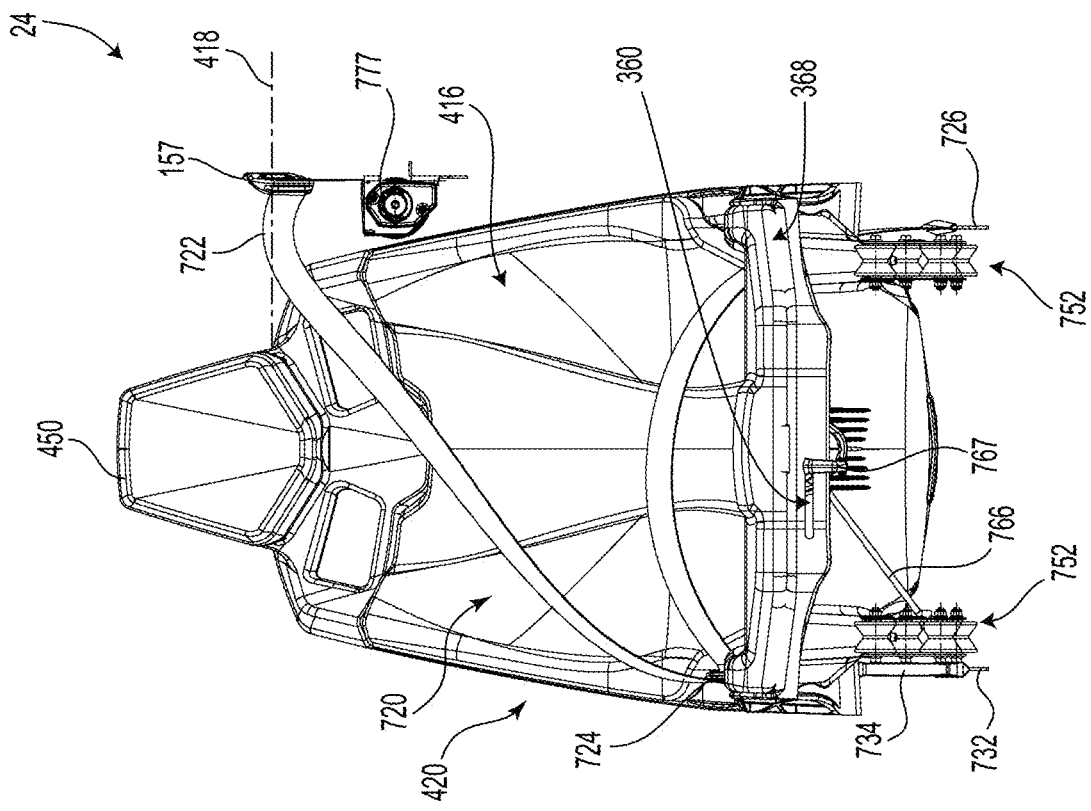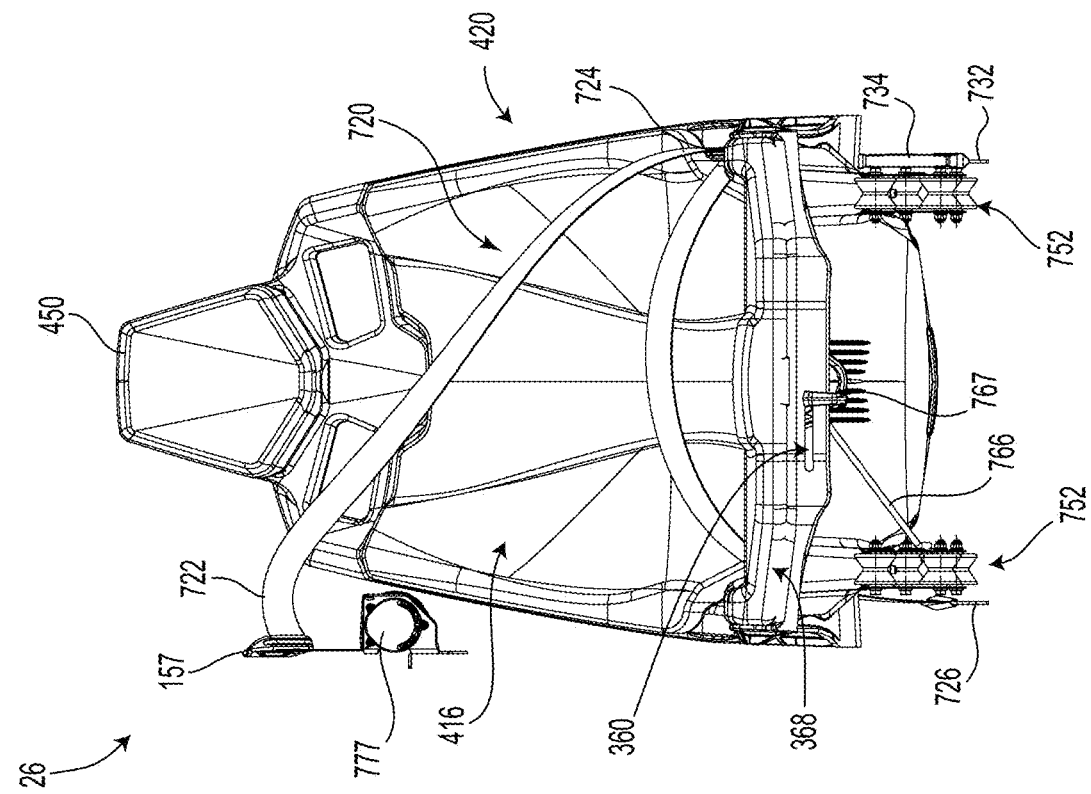
FIG. 20

VEHICLE WITH ADJUSTABLE SEATS AND SEAT BELT ASSEMBLIES

CROSS-REFERENCE

The present application claims priority to U.S. Provisional Patent Application No. 62/367,779, filed Jul. 28, 2016, entitled "Seat Adjustment Assembly And Vehicle With Adjustable Seats," and U.S. Provisional Patent Application No. 62/371,441, filed Aug. 5, 2016, entitled "Seat Adjustment Assembly And Vehicle With Adjustable Seats," the entirety of both of which is incorporated herein.

FIELD OF TECHNOLOGY

The present technology relates to vehicles having adjustable position seats and seat belt assemblies.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

Seats in vehicles, including side-by-side vehicle, are often adjustable to allow a seat occupant to find their preferred longitudinal (forward to rearward) position in the vehicle. Each seat in a side-by-side vehicle includes a seat belt assembly for protecting the seat occupant. Seat belt assemblies are generally connected to the seat, such that the seat belt assembly can shift longitudinally with the seat when the seat's longitudinal position is adjusted.

By connecting the seat belt assembly to the seat, however, the seat must be designed to handle loads of the seat belt assembly in operation. This can result in complex, heavy, and/or costly seats.

Thus there is a desire for adjustable seats and seat belt assemblies for side-by-side off-road vehicles with improved cost, weight, and/or complexity, while still being operable in multiple positions.

SUMMARY

It is an object of the present technology to ameliorate at least some of the inconveniences present in the prior art.

According to one aspect of the present technology, there is provided a vehicle including a frame; a plurality of ground engaging members operatively connected to the frame; a motor operatively connected to at least one of the ground engaging members; and at least one seat connected to the frame and being translatable with respect to the frame between at least a forward position and a rearward position, the at least one seat including: a seat body defining: a belt aperture, and a buckle aperture; and at least one seat belt assembly connected to the frame and including a seat belt extending through the belt aperture of the seat body of the at least one seat and having an end connected to the frame, a male buckle connector slidably connected to the seat belt, and a female buckle receptacle for receiving the male buckle connector, the female buckle receptacle extending through the buckle aperture of the seat body of the at least one seat and having an end connected to the frame, the at least one seat belt assembly being operable with the at least one seat when the at least one seat is in at least both of the forward position and the rearward position.

In some implementations, the end of the seat belt is pivotably connected to the frame; and the end of the female buckle receptacle is pivotably connected to the frame.

In some implementations, the belt aperture has at least a rear edge; the buckle aperture has at least a rear edge; and when the at least one seat is in the forward position: a portion of the seat belt extending through the belt aperture is forward of and spaced from the rear edge of the belt aperture, and a portion of the female buckle receptacle extending through the buckle aperture is forward of and spaced from the rear edge of the buckle aperture.

In some implementations, the belt aperture has at least a front edge; the buckle aperture has at least a front edge; and when the at least one seat is the rearward position: a portion of the seat belt extending through the belt aperture is rearward of and spaced from the front edge of the belt aperture, and a portion of the female buckle receptacle extending through the buckle aperture is rearward of and spaced from the front edge of the buckle aperture.

In some implementations, a first rail connected to the frame, and a second rail connected to the frame; and wherein the at least one seat further includes: a first roller assembly connected to the seat body, and a second roller assembly connected to the seat body on a side of the seat body opposite the first roller assembly; the first rail passes through the first roller assembly; the second rail passes through the second roller assembly; the first rail and the second rail support the at least one seat via the first roller assembly and the second roller assembly; the at least one seat is translatable with respect to the frame via the first and second roller assemblies rolling on the first and second rails; the end of the seat belt is pivotably connected to the first rail; and the end of the female buckle receptacle is pivotably connected to the second rail.

In some implementations, the end of the seat belt is pivotably connected to the first rail rearward of a rearward most roller of the first roller assembly; and the end of the female buckle receptacle is pivotably connected to the second rail rearward of a rearward most roller of the second roller assembly.

In some implementations, the end of the seat belt is pivotably connected to a casting fixed to a rear end of the first rail; and the end of the female buckle receptacle is pivotably connected to a casting fixed to a rear end of the second rail.

In some implementations, a front end of the first rail is higher than a rear end of the first rail; a front end of the second rail is higher than a rear end of the second rail; and the seat is higher when in the forward position than when in the rearward position, the forward position being defined when the at least one seat is near the front end of the first rail and the second rail, the rearward position being defined when the at least one seat is near the rear end of the first rail and the second rail.

In some implementations, at least one of the first roller assembly and the second roller assembly includes an adjustment rod extending at least partially forward; and the seat body further defines a rod slot through which the adjustment rod extends, lateral motion of the adjustment rod being limited by the rod slot.

In some implementations, the vehicle further includes a first spacer connected to the frame at a bottom end, the first spacer being connected to the first rail at a top end, the first spacer being selectively removable; a second spacer connected to the frame at a bottom end, the second spacer being connected to the second rail at a top end, the second spacer being selectively removable; and wherein the first spacer is selectively replaceable by a third spacer of a different length; the second spacer is selectively replaceable by a fourth spacer of a different length; and a height of the at least one seat is altered by replacement of the first spacer by the third spacer and replacement of the second spacer by the fourth spacer.

In some implementations, a height of the end of the seat belt is altered by replacement of the first spacer by the third spacer; and a height of the end of the female buckle receptacle is altered by replacement of the second spacer by the fourth spacer.

In some implementations, the seat body includes a base portion defining at least a portion of the belt aperture, and the buckle aperture; a backrest portion extending at least partially upward from the base portion; and a headrest portion extending at least partially upward from the backrest portion.

In some implementations, the base portion, the backrest portion, and the headrest portion are integrally connected in a monocoque seat structure.

In some implementations, the backrest portion has a top edge; and at least a portion of the at least one seat belt assembly extends above the top edge of the backrest portion.

In some implementations, the base portion of the at least one seat has a top surface; and at least a portion of the female buckle receptacle extends above the top surface of the base portion.

In some implementations, the at least one seat includes a plurality of rigid ribs extending along at least a portion of right and left sides of the at least one seat.

In some implementations, the plurality of rigid ribs extend along at least a portion of the base portion and the backrest portion of the at least one seat.

In some implementations, the plurality of rigid ribs define at least a portion of the buckle aperture and the belt aperture.

In some implementations, the end of the seat belt is a first end of the seat belt; and a second end of the seat belt, opposite the first end of the seat belt, is connected to the frame, the second end of the seat belt being vertically higher than the first end of the seat belt.

In some implementations, the first end of the seat belt, the second end of the seat belt, and the belt aperture are disposed to one side of a centerline of the at least one seat; and the buckle aperture is disposed to an other side of the centerline of the at least one seat.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Explanations and/or definitions of terms provided in the present application take precedence over explanations and/or definitions of these terms that may be found in any documents incorporated herein by reference.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 20 is a front elevation view of the driver seat, a passenger, and seat belt assemblies of the vehicle of FIG. 1;

DETAILED DESCRIPTION

Figure 1:
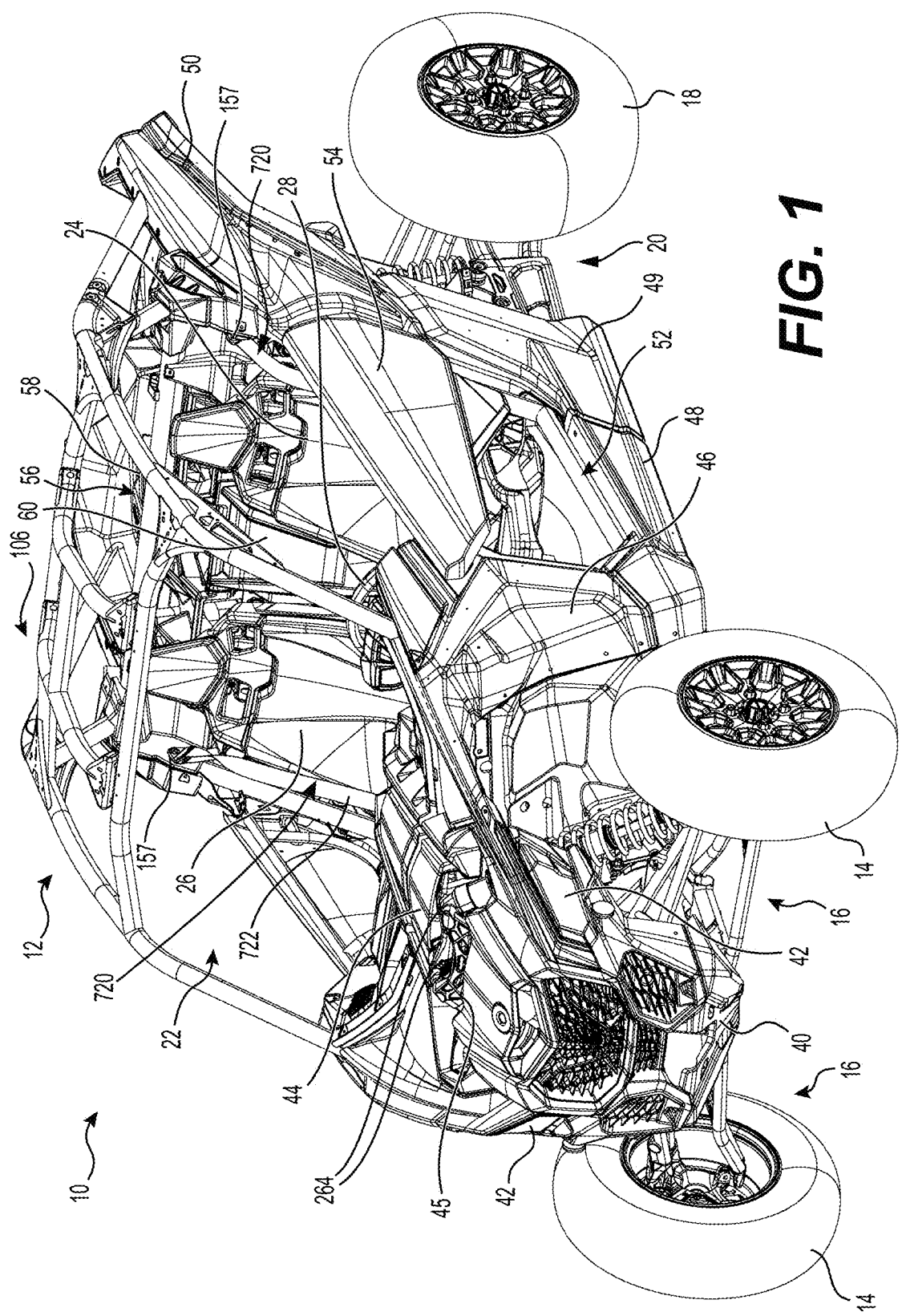
FIG. 1 is a perspective view of an off-road side-by-side vehicle taken from a front, left side.

The present technology is described herein with respect to a four-wheel off-road vehicle 10 having two side-by-side seats and a steering wheel. However, it is contemplated that some aspects of the present technology may apply to other types of vehicles such as, but not limited to, off-road vehicles having more or less than four wheels, off-road vehicles having ground engaging members other than wheels, and off-road vehicles having more or less than two seats.

The general features of the off-road vehicle 10 will be described with respect to FIGS. 1 to 19. The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. The seats 24, 26 will be described in more detail below.

Figure 11:
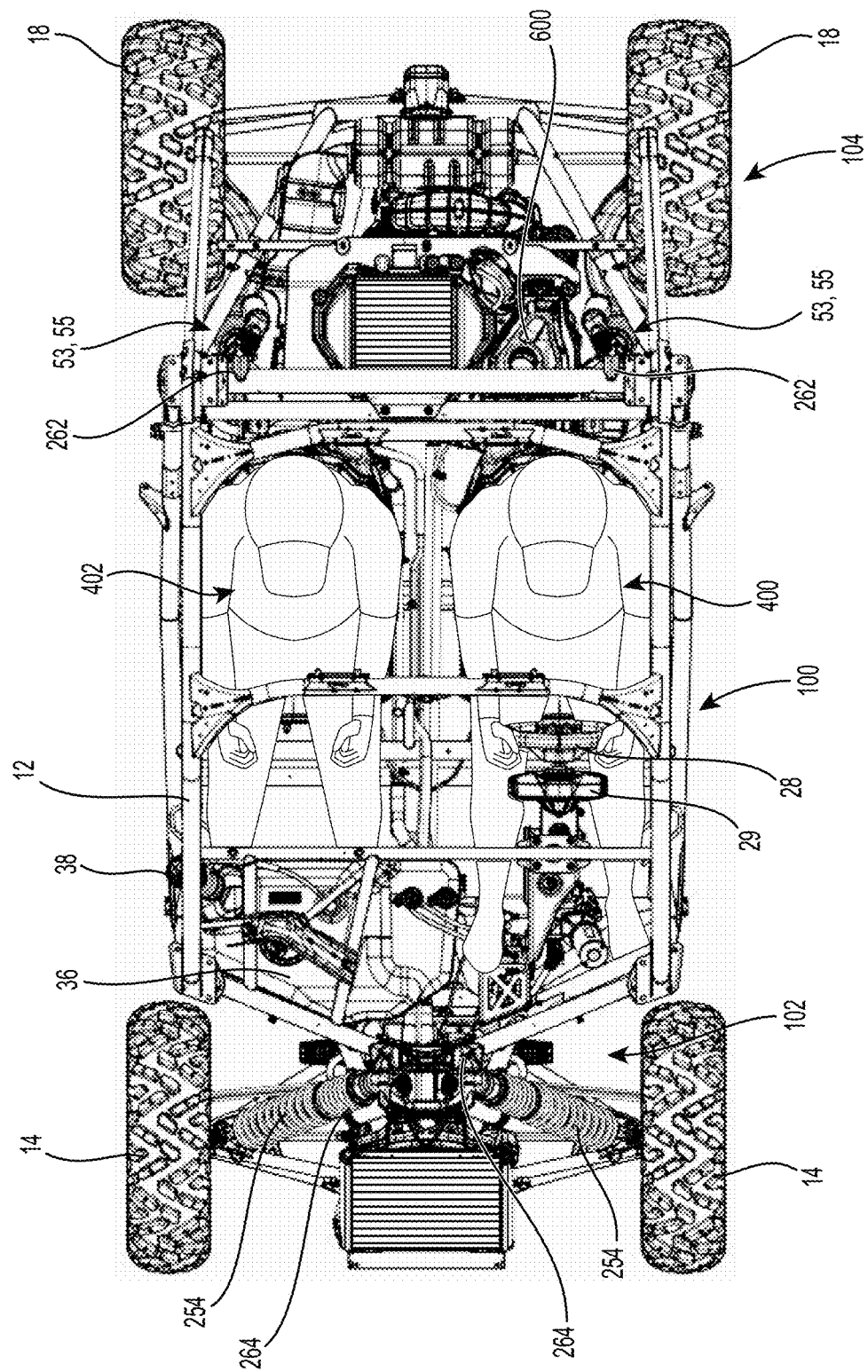
FIG. 11 is the top plan view of FIG. 10 with the body panels removed and with the driver and a passenger seated therein.
Figure 15:
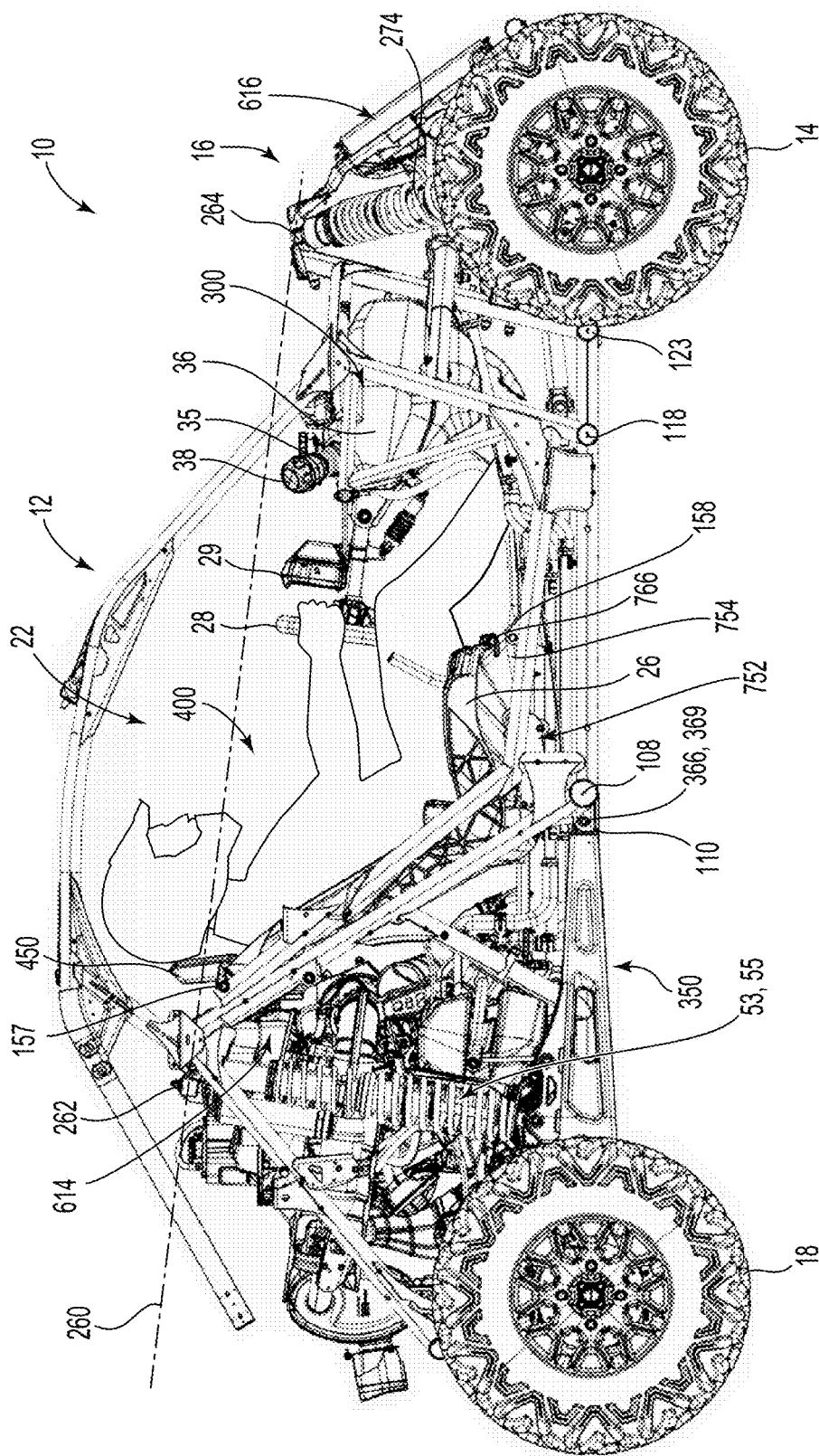
FIG. 15 is the right side elevation view of FIG. 14 with the driver in the driver seat.
Figure 16:
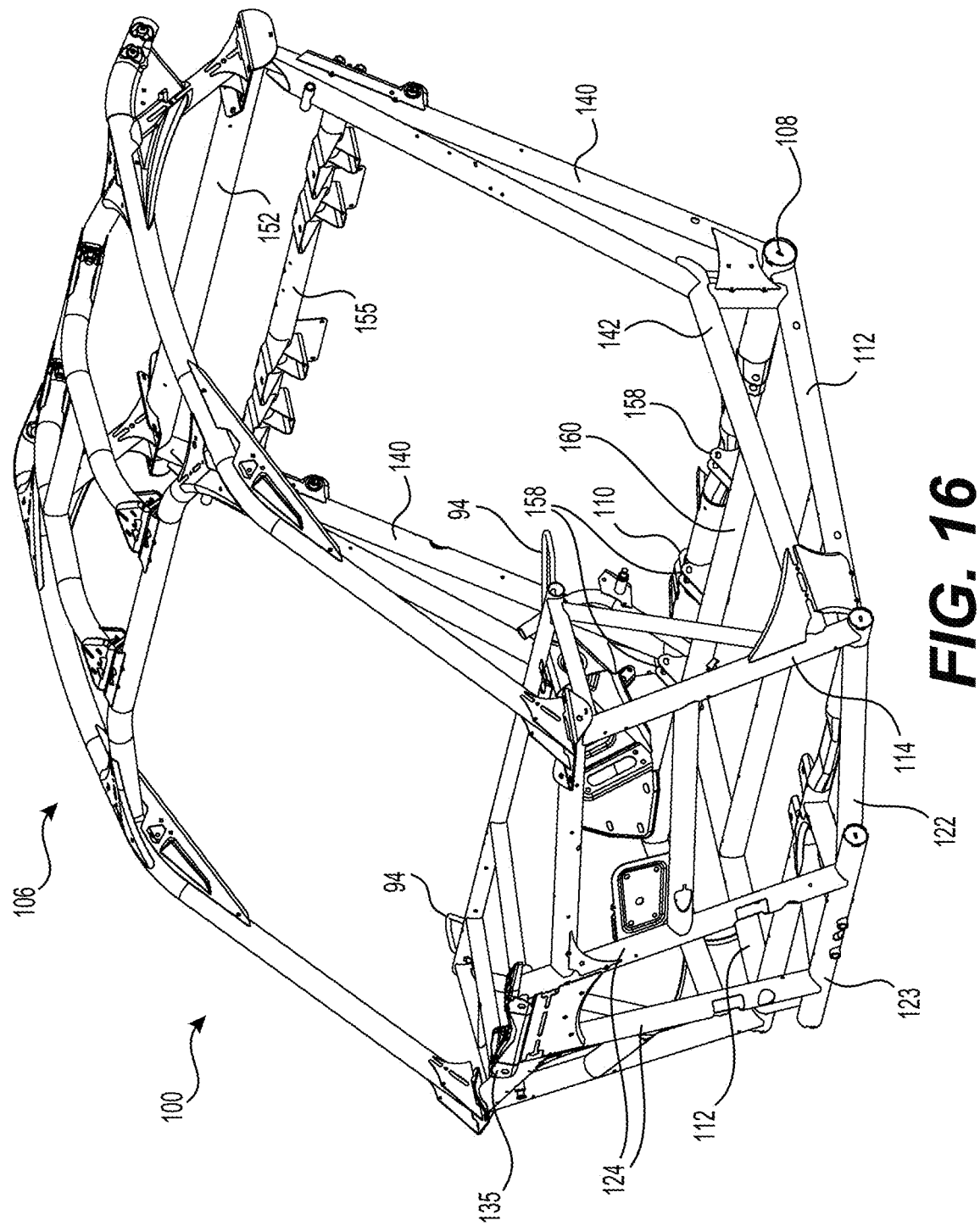
FIG. 16 is a front, left side perspective view of a central portion of the frame of the vehicle of FIG. 1.

A steering wheel 28 is disposed in front of the driver seat 24. The steering wheel 28 is used to turn the front wheels 14 to steer the vehicle 10. A bracket 139 (FIG. 13) is used to connect the steering wheel 28 to a frame structure 138 disposed forward of the seats 24, 26. A fuel tank assembly 300, including a fuel tank 36, is connected to the frame structure 138 forward of the passenger seat 26. A filler neck 35 that is selectively closed by a cap 38 extends upward, rightward and rearward from a top, right and rear portion of the fuel tank 36. A fuel pump (not shown) is inserted through a top of the fuel tank 36. As can be seen in FIGS. 11 and 15, a foot area for a driver 400 and a foot area of a passenger 402 extends forward past a rearward most end of the fuel tank 36.

As would be understood, in countries where regulations require the steering wheel 28 to be disposed on a right side of the vehicle 10, the bracket 139 used to support the steering wheel 28 and the fuel tank assembly 300 would be connected on the left side of the frame structure 138. Various displays and gauges 29 are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

Figure 12:
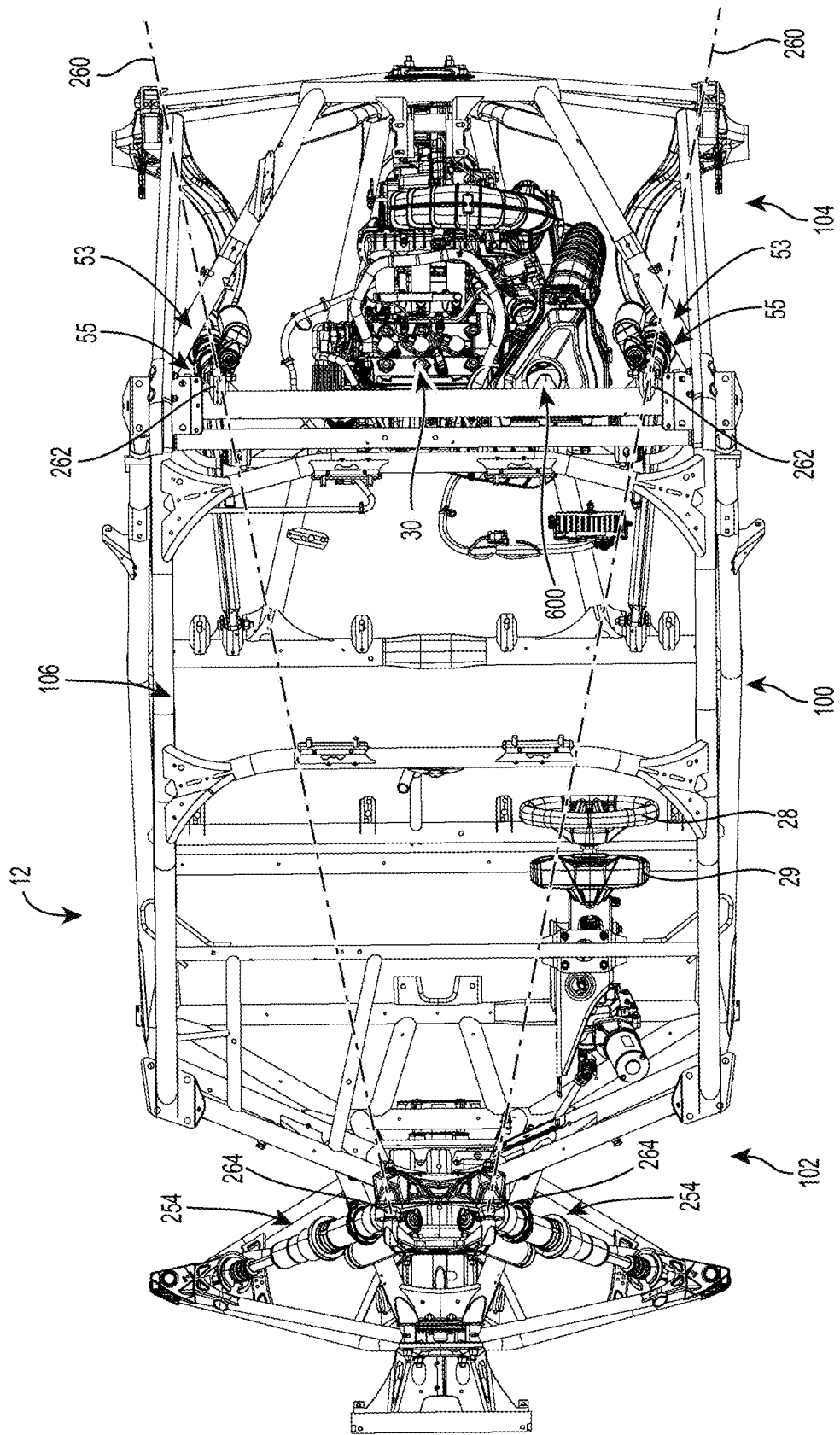
FIG. 12 is a top plan view of a frame and some components of the vehicle of FIG. 1.
Figure 13:
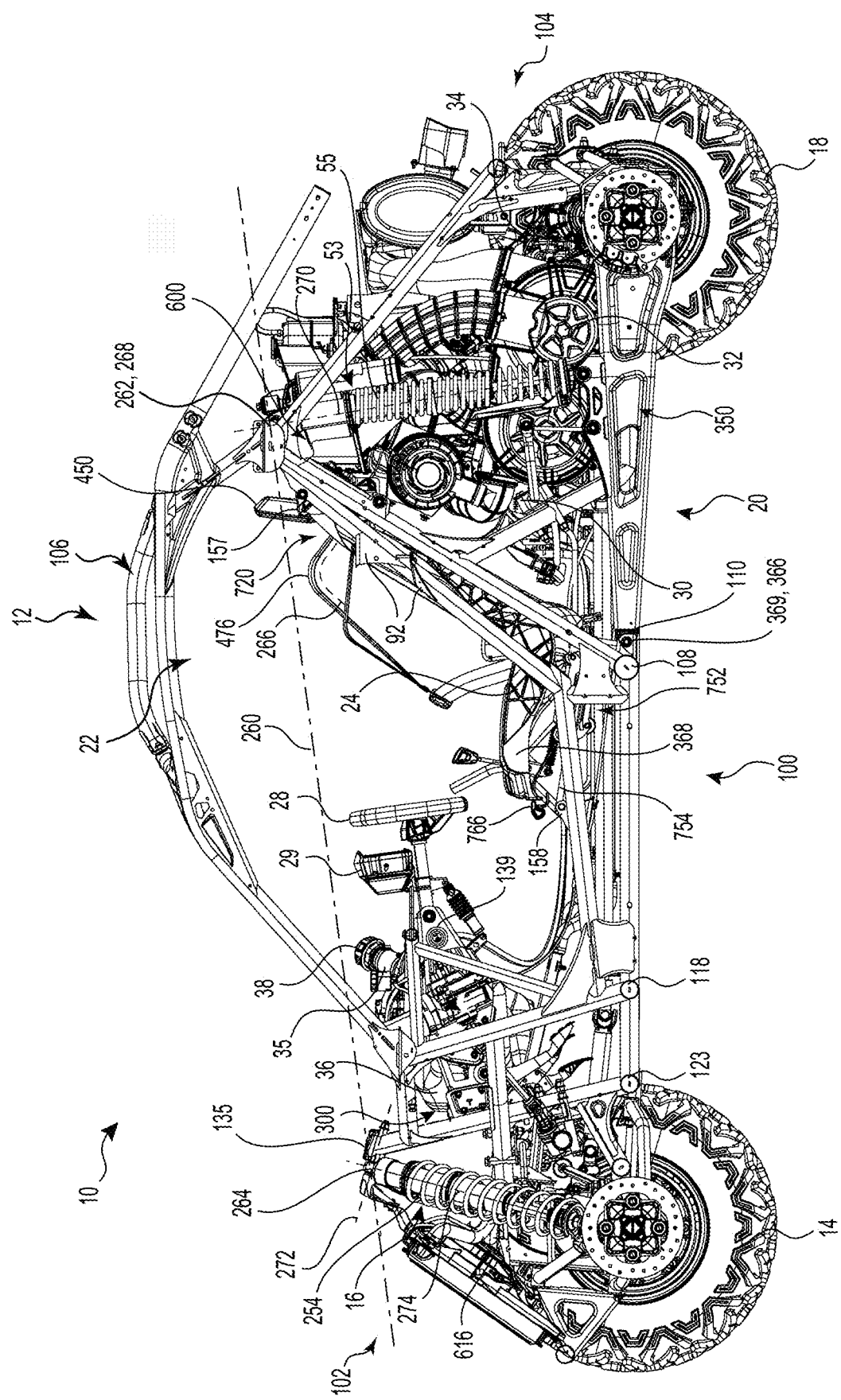
FIG. 13 is a left side elevation view of the vehicle of FIG. 1 with the body panels and left wheels removed.
Figure 14:
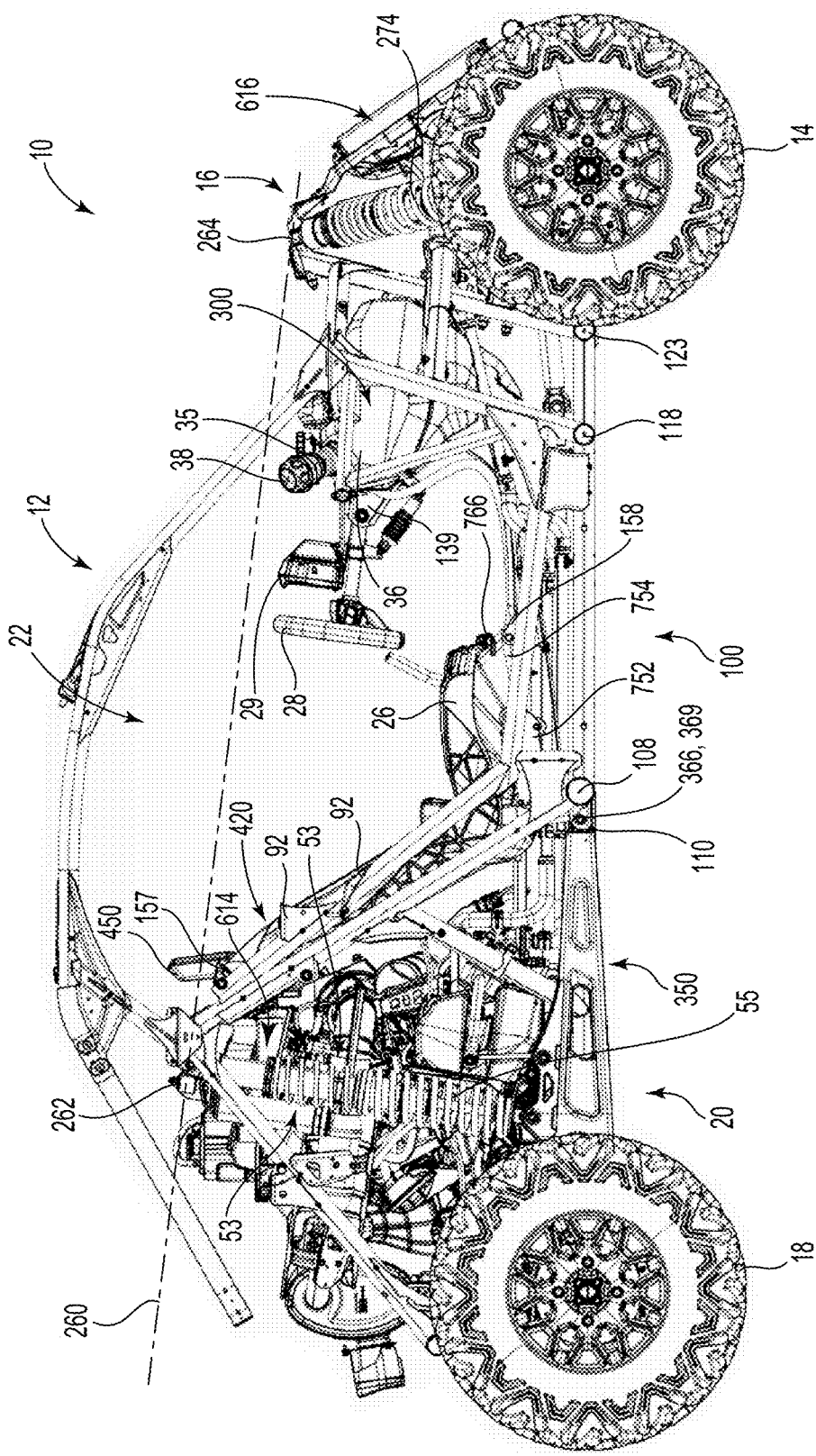
FIG. 14 is a right side elevation view of the vehicle of FIG. 1 with the body panels removed.

As can be seen in FIGS. 12 and 13, a motor 30 is connected to the frame 12 in a rear portion of the vehicle 10. In the present implementation, the motor 30 is an in-line, three-cylinder, four-stroke internal combustion engine 30. It is contemplated that other types of internal combustion engines could be use, such as a V-twin or a two-stroke internal combustion engine for example. It is also contemplated that in some implementations, the engine 30 could be replaced by another type of motor such as a diesel engine or an electric motor for example.

As can be seen in FIG. 13, a radiator 616 is connected to the front portion of the frame 102. The radiator 616 is used to cool engine coolant used to cool the engine 30. An air intake system has an upwardly facing air inlet 600 above a front, left portion of the engine 30. The air inlet 600 supplies air to the engine 30. The engine 30 is connected to a continuously variable transmission (CVT) 32 disposed on a left side of the engine 30. The CVT 32 is operatively connected to a transaxle 34 to transmit torque from the engine 30 to the transaxle 34. The transaxle 34 is disposed behind the engine 30. The transaxle 34 is operatively connected to the front and rear wheels 14, 18 to propel the vehicle 10.

Turning back to FIGS. 1 to 9, body panels of the vehicle 10 will be described. The body panels are connected to the frame 12. The panels help protect the internal components of the vehicle 10 and provide some of the aesthetic features of the vehicle 10. Front panels 40 are connected to a front of the frame 12. The front panels 40 are disposed forward of the front suspension assemblies 16 and laterally between the front wheels 14. The front panels 40 define two apertures inside which the headlights 42 of the vehicle 10 are disposed. A cover 44 extends generally horizontally reward from a top of the front panels 40. The cover 44 defines an aperture 45 through which tops of the front suspension assemblies 16 protrude; the front suspension assemblies will be described in greater detail below.

Figure 2:
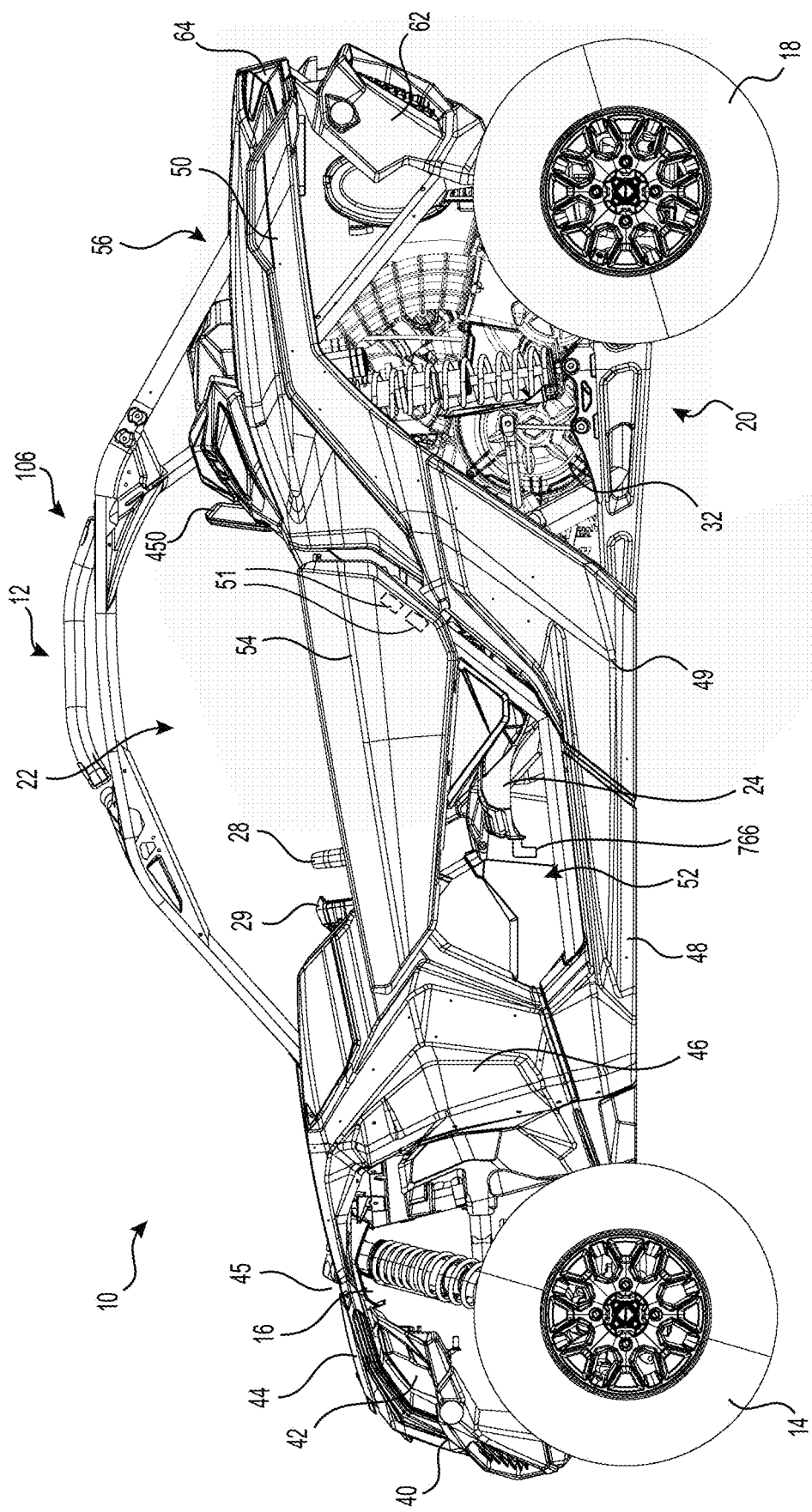
FIG. 2 is a left side elevation view of the vehicle of FIG. 1.
Figure 3:
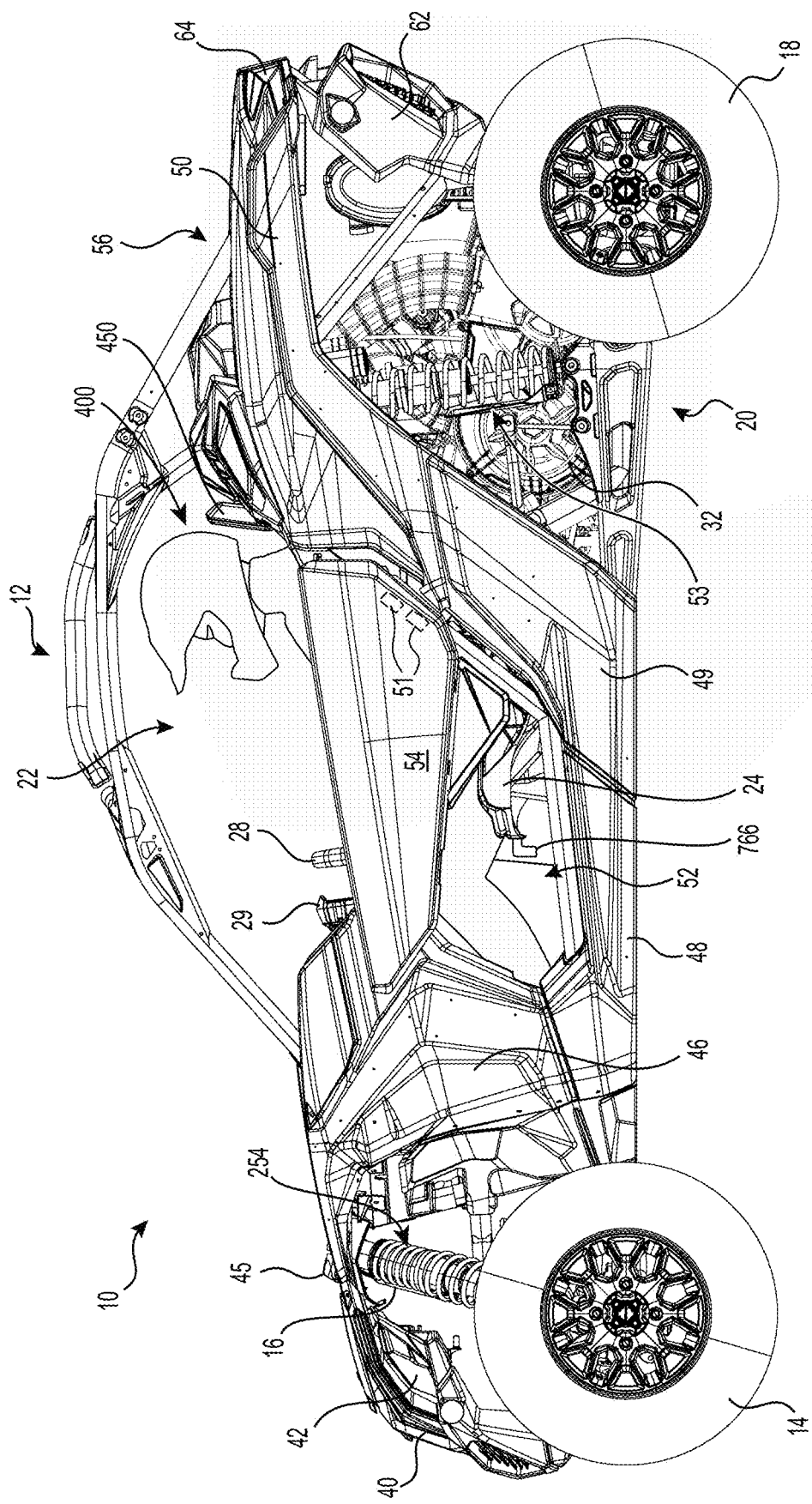
FIG. 3 is the left side elevation view of the vehicle of FIG. 1 with a driver in a driver seat.
Figure 4:
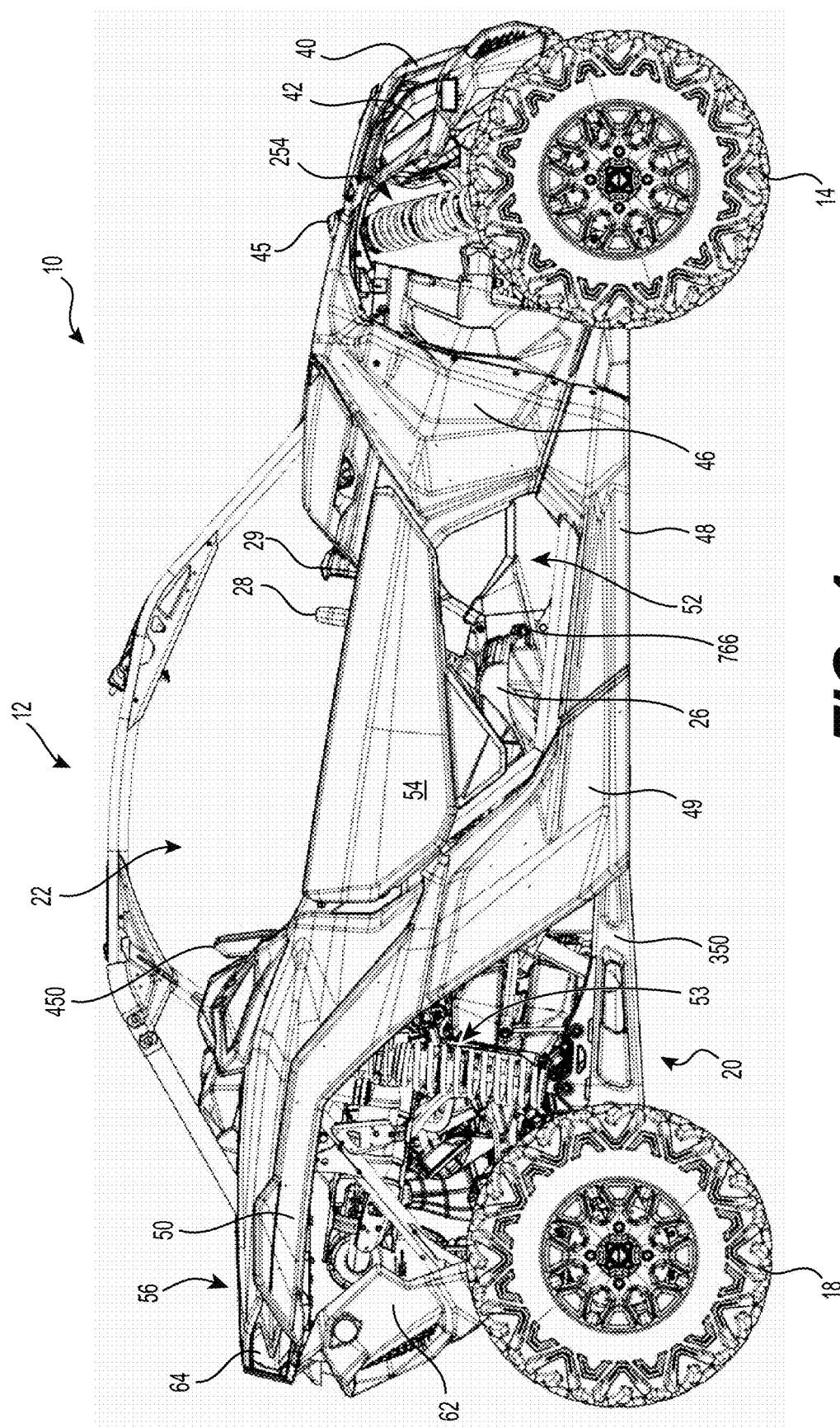
FIG. 4 is a right side elevation view of the vehicle of FIG. 1.
Figure 5:
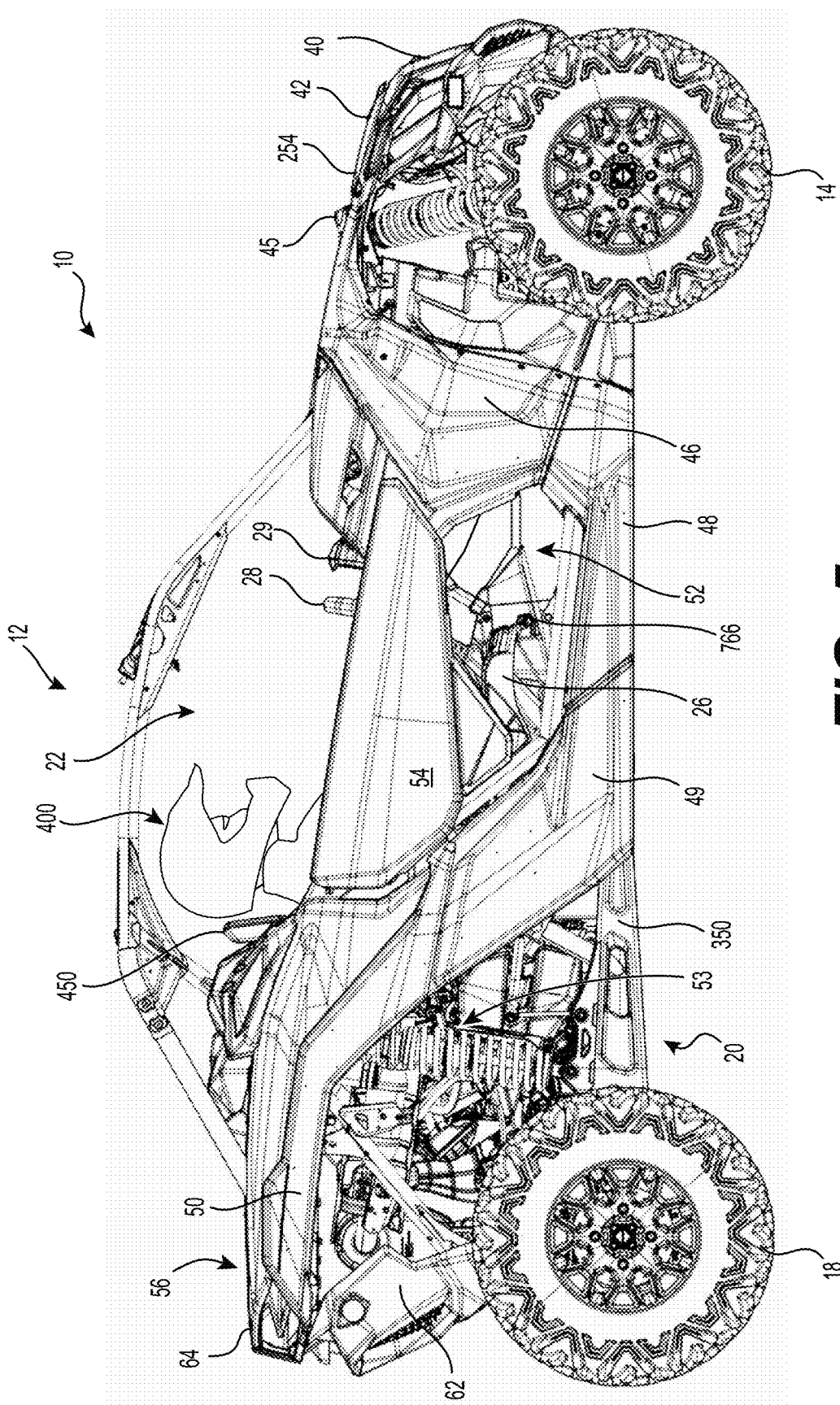
FIG. 5 is the right side elevation view of FIG. 4 with the driver in the driver seat.
Figure 6:
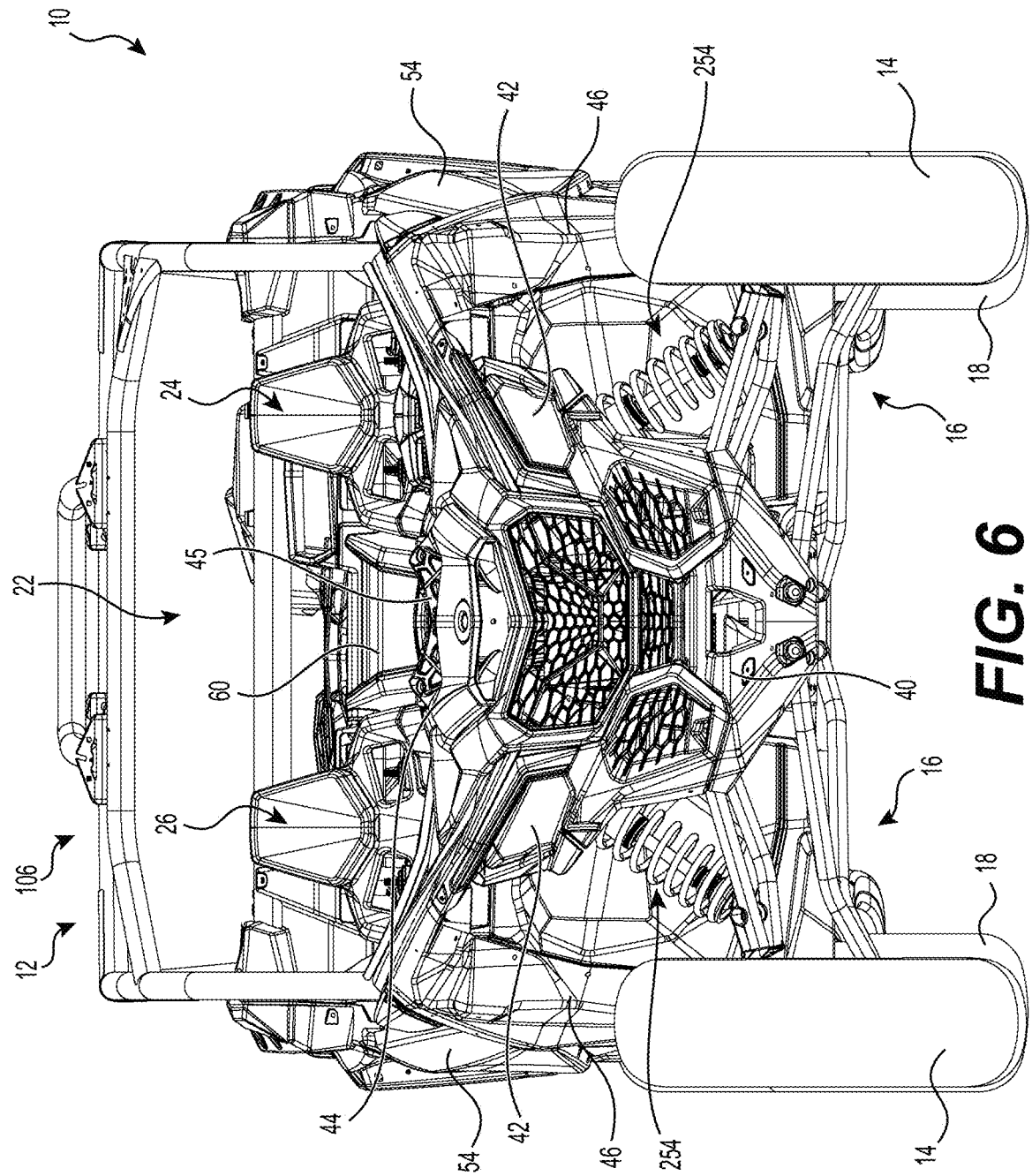
FIG. 6 is a front elevation view of the vehicle of FIG. 1.

Front fenders 46 are disposed rearward of the front panels 40 on each side of the vehicle 10. Each front fender 46 is disposed in part above and in part behind of its corresponding front wheel 14. Lower panels 48 extend along the bottom of the frame 12 between the front and rear wheels 14, 18. As can be seen in FIG. 2 for the left lower panel 48, each lower panel 48 has a front end disposed under the bottom portion of its corresponding front fender 46 and extends rearward therefrom. A generally L-shaped panel 49 is disposed behind the rear end of each lower panel 48. Generally L-shaped rear fenders 50 extend upward and then rearward from the rear, upper ends of the L-shaped panels 49. Each rear fender 50 is disposed in part above and in part forward of its corresponding rear wheel 18. The rear fenders 50 define apertures at the rear thereof to receive the brake lights 64 of the vehicle 10. It is contemplated that the brake lights 64 could be replaced with reflectors or that reflectors could be provided in addition to the brake lights 64.

On each side of the vehicle 10, the front fender 46, the lower panel 48, the L-shaped panel 49 and the rear fender 50 define a passage 52 through which a driver (or passenger depending on the side of the vehicle 10) can enter or exit the vehicle 10. Each side of the vehicle 10 is provided with a door 54 that selectively closes an upper portion of the corresponding passage 52. Each door 54 has two hinges 51 (shown schematically in FIG. 2) at a rear thereof, connected to brackets 92 (FIGS. 13 and 17) connected to the member 148. It is contemplated that each door 54 could be connected to the frame 12 via a single hinge. Each door 54 is selectively connected at a front thereof to a frame element 94 via a releasable latch (not shown) provided in the door 54. It is contemplated that each door 54 could be hinged at a front thereof and latched at a rear thereof.

Figure 7:
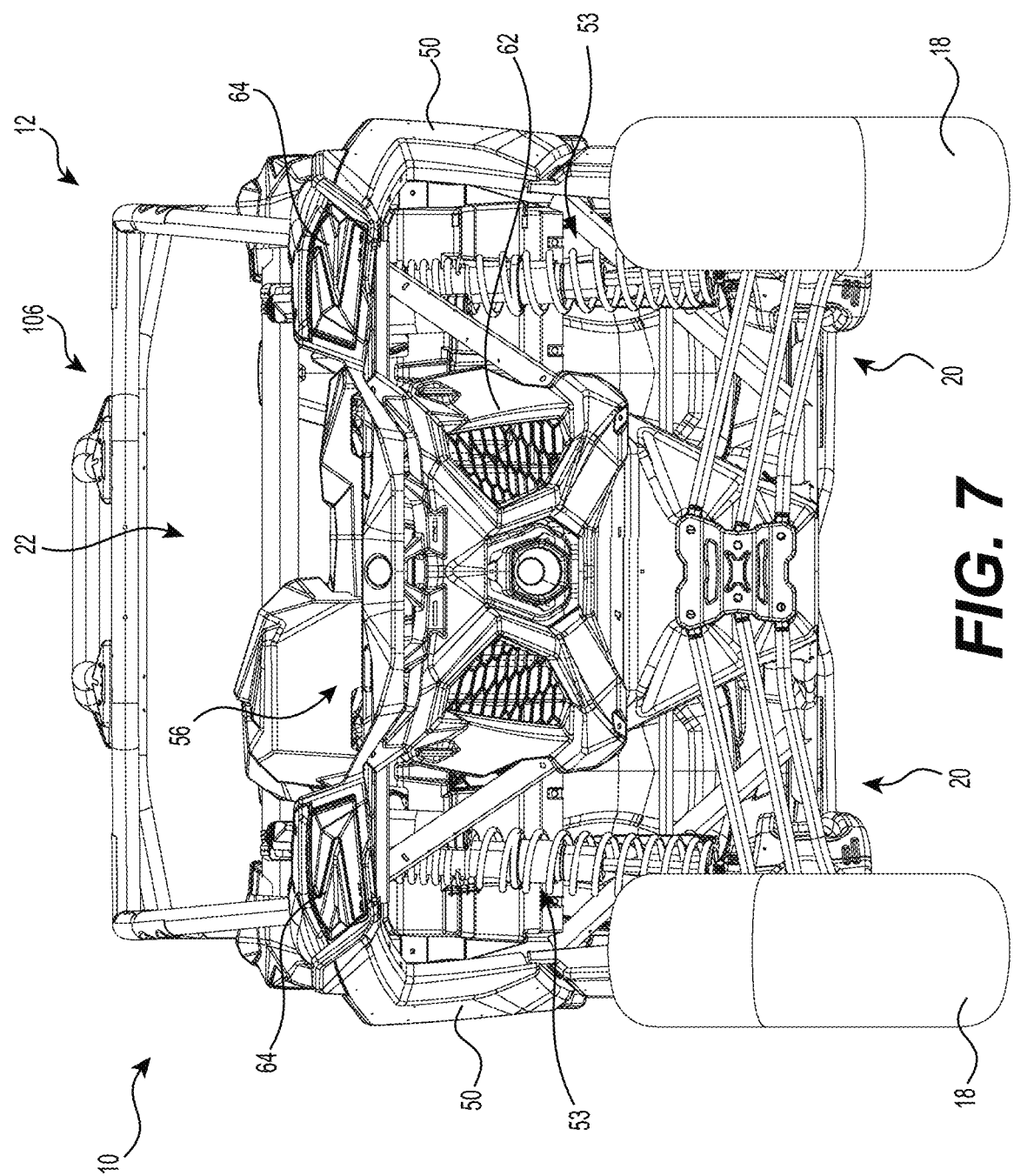
FIG. 7 is a rear elevation view of the vehicle of FIG. 1.
Figure 8:
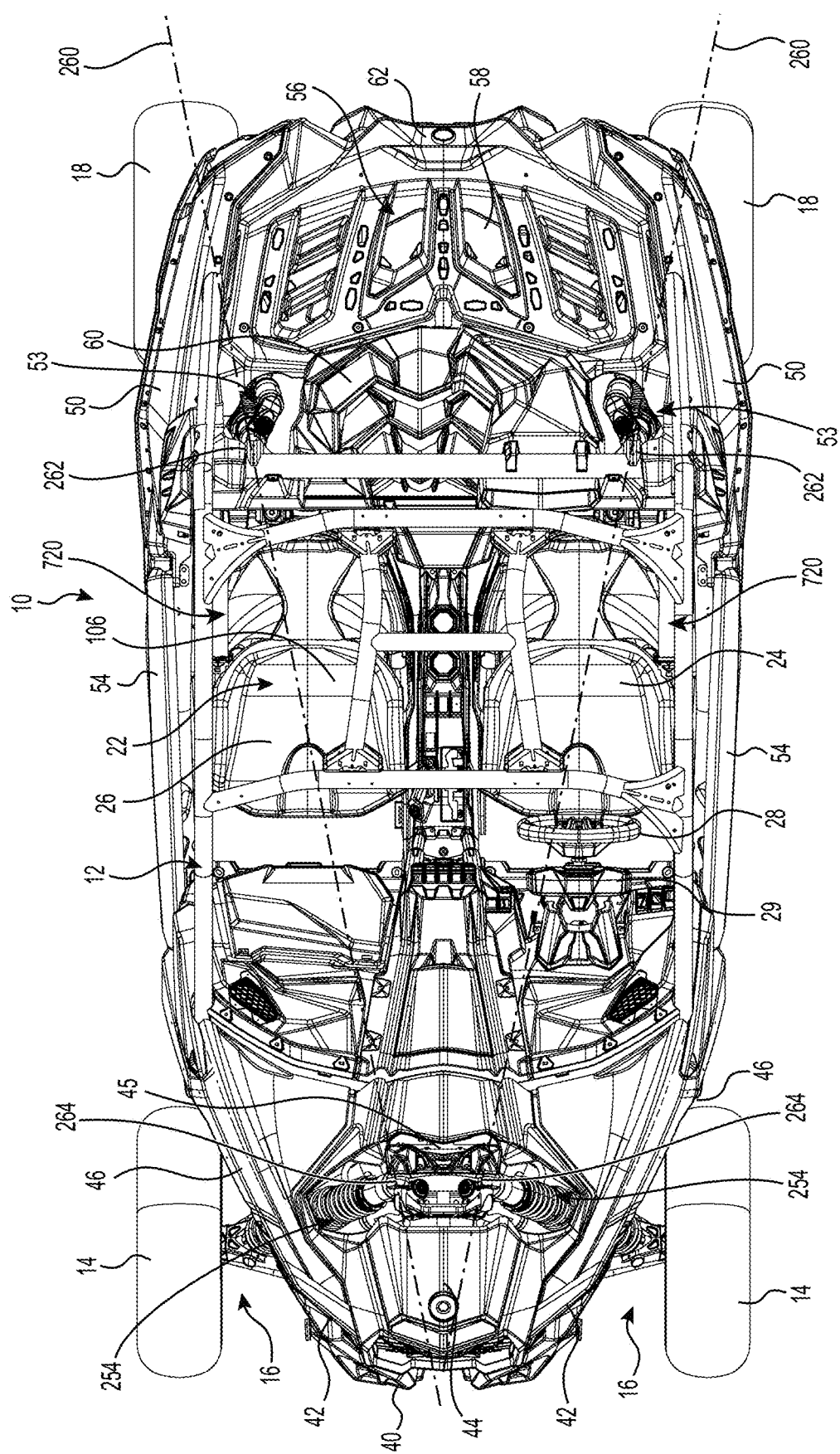
FIG. 8 is a top plan view of the vehicle of FIG. 1.
Figure 9:
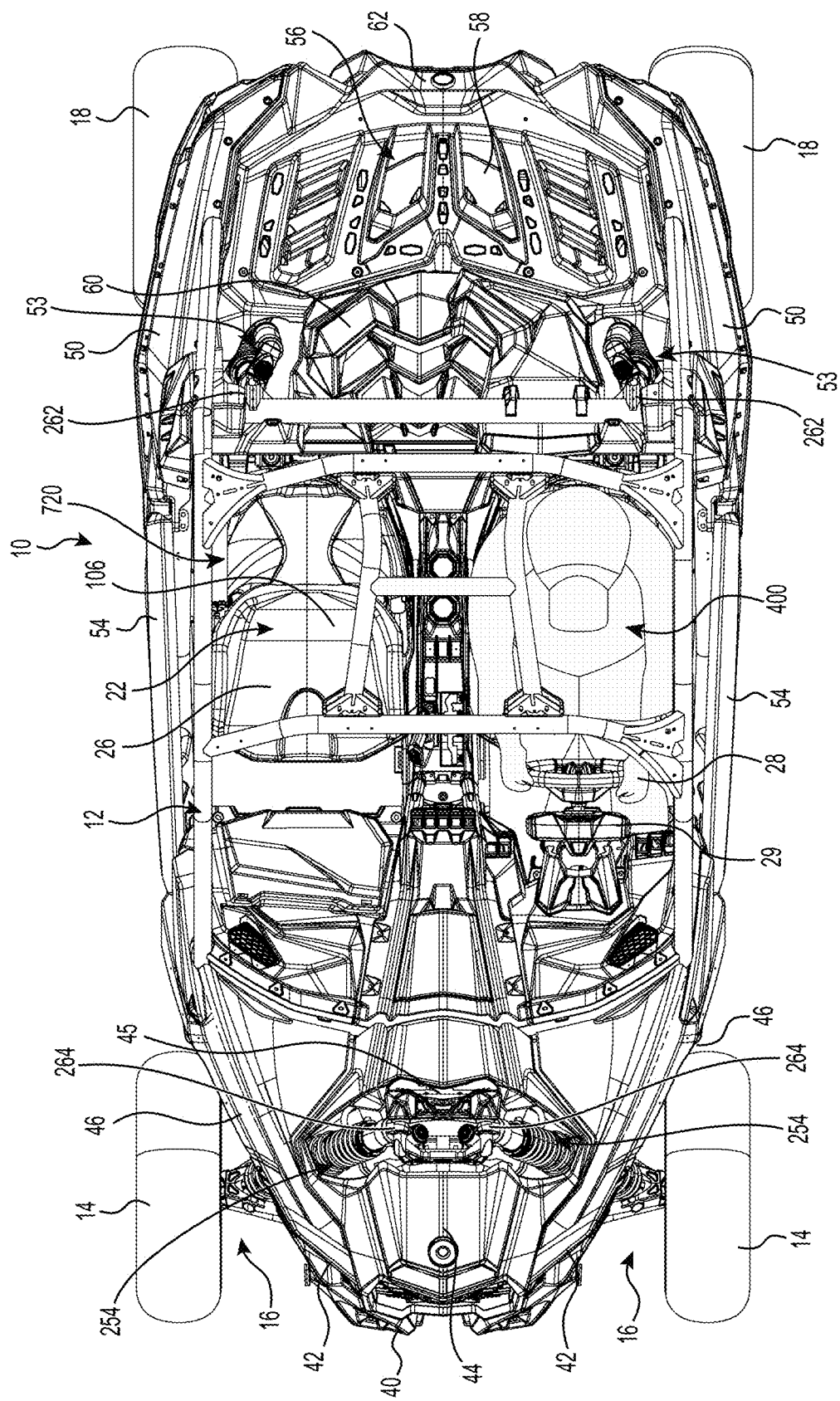
FIG. 9 is the top plan view of FIG. 8 with the driver in the driver seat.
Figure 10:
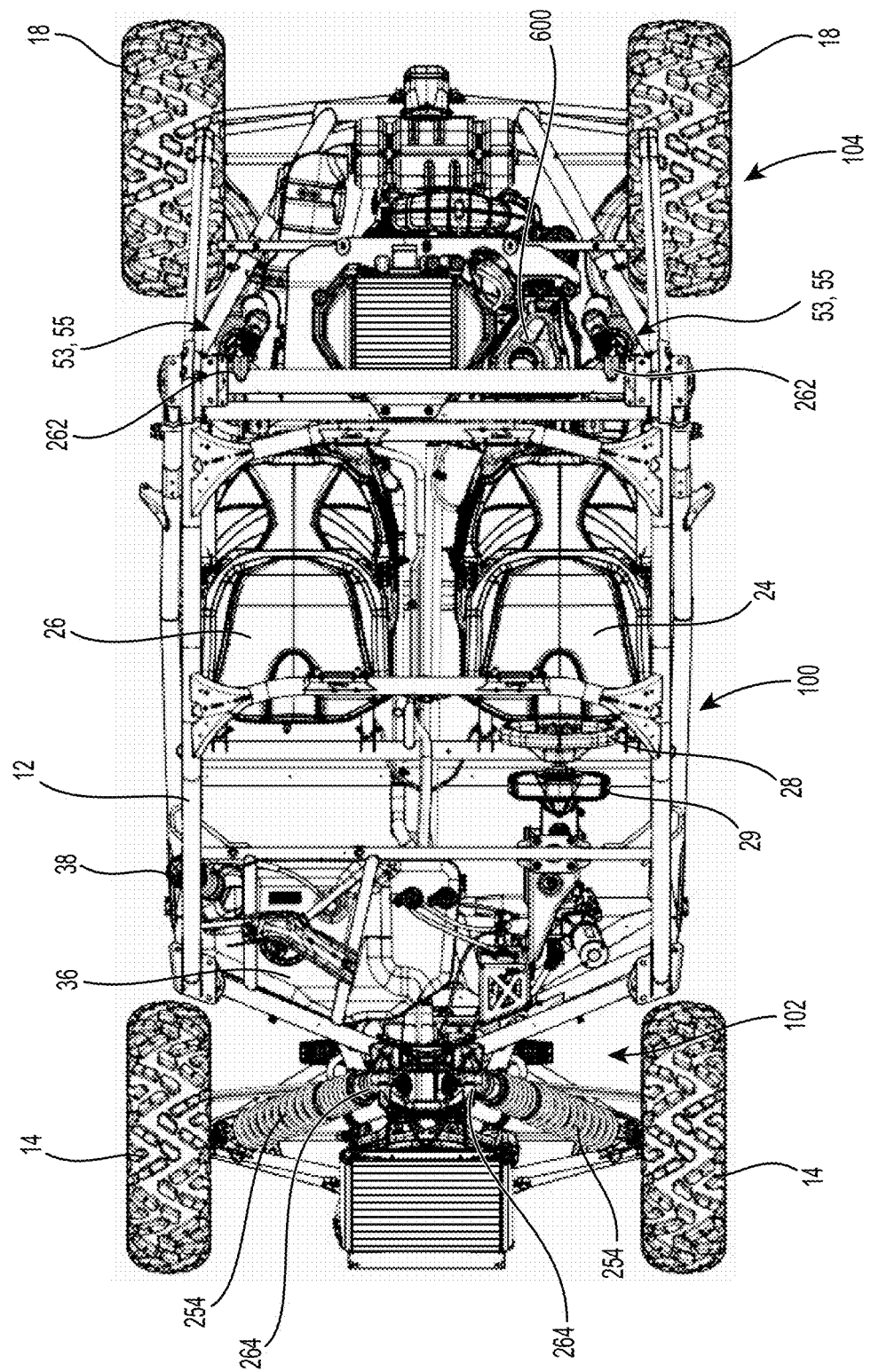
FIG. 10 is a top plan view of the vehicle of FIG. 1 with body panels removed.

As best seen in FIG. 8, the rear fenders 50 define a cargo space 56 therebetween behind the seats 24, 26. The cargo space 56 has a floor 58 extending horizontally between the rear fenders 50. The floor 58 has a plurality of apertures such that the floor 58 can act as an attachments base to receive anchors such as those described in U.S. Pat. No. 8,875,830, issued Nov. 4, 2014, the entirety of which is incorporated herein by reference, in order to secure various items in the cargo space 56. It is contemplated that hooks or loops could be provided instead of or in addition to the apertures in the floor 58. It is also contemplated that the floor 58 could not be provided with any attachment features. It is contemplated that the floor 58 could be replaced by a cargo box that can be tilted in order to dump its content. A separation panel 60 extends laterally and is disposed longitudinally between the seats 24, 26 and the floor 58. As a result, the separation panel 60 separates the cockpit area 22 from the cargo area 56. As best seen in FIGS. 7 and 8, a rear panel 62 is disposed laterally between the rear wheels 18 behind the floor 58.

Turning now to FIGS. 12 to 19, portions of the frame 12 of the vehicle 10 will now be described. The frame 12 has a central portion 100, a front portion 102 and a rear portion 104. As their names suggest, the front portion 102 is disposed in front of the central portion 100 and the rear portion 104 is disposed behind the central portion 100. The central portion 100 defines the cockpit area 22 in which the seats 24, 26 are disposed. The central portion 100 also defines a roll cage 106. The front suspension assemblies 16 are connected to the central and front portions 100, 102 of the frame 12. The engine 30, the CVT 32 and the transaxle 34 are supported by the rear portion 104 of the frame 12. The rear suspension assemblies 20 are connected to the central and rear portions 100, 104 of the frame 12.

The frame 12 is made from a plurality of hollow cylindrical steel members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets described below could be cast or otherwise formed as a single component. It is also contemplated that the frame 12 could have more or less members and brackets than described below depending on the type of materials used, the required strength and rigidity of the frame 12 and the weight of the components attached to the frame 12 for example.

Figure 17:
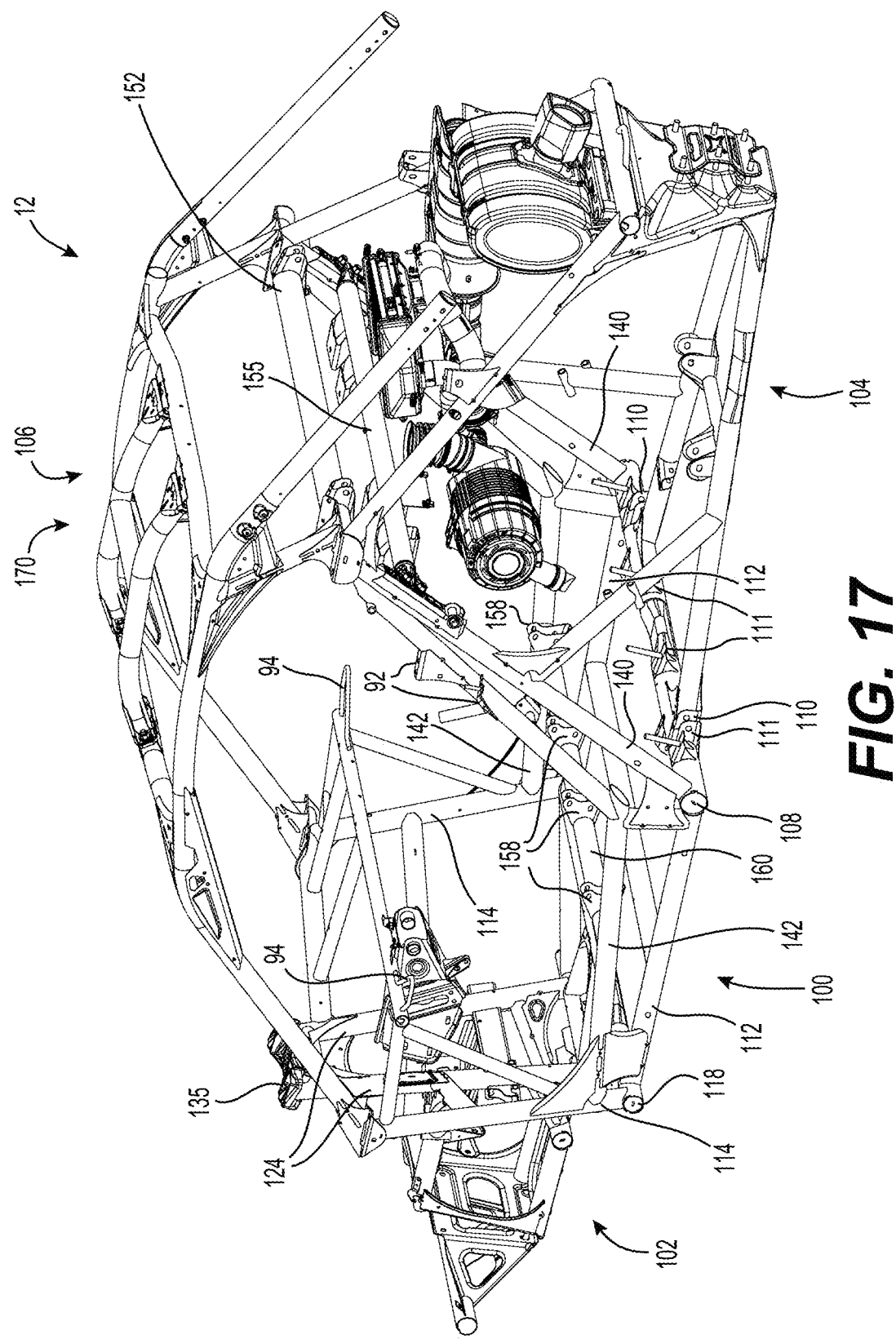
FIG. 17 is a rear, left side perspective view of the frame and portions of the air intake and exhaust systems of the vehicle of FIG. 1.

The central portion 100 of the frame 12 has a laterally extending bottom member 108. Brackets 110, 111, best seen in FIG. 17, are connected to the rear of the bottom member 108 and extend rearward from the member 108. The brackets 110, 111 are disposed laterally inward of the ends of the bottom member 108. The brackets 111 are used to connect the rear of the seats 24, 26 as will be described below. Two bottom members 112 are connected at their rear ends to the ends of the bottom member 108. From the bottom member 108, the bottom members 112 extend forward and laterally inward.

The brackets 110 are used to connect the rear suspension assemblies 20. Each rear suspension assembly 20 has a trailing arm 350 connected to a shock absorber 55 of a rear shock absorber assembly 53 at a point 355 (see FIGS. 18 and 19). The trailing arm 350 is pivotally connected at its front end to the bracket 110 of the central portion 100 of the frame 12 by a ball joint 369. The ball joint 369 is connected about an axis 366 that is disposed below the passenger seat 26.

Rear members 140 extend upward and rearward from the ends of the bottom member 108. Generally vertical members 114 extend upward from the ends of the laterally extending member 118. Diagonal members 122 extend forward and laterally inward from the ends of the laterally extending member 118 and connect at their front ends to a laterally extending member 123. Two other generally vertical members 124 are connected at their bottom ends to the top of a laterally extending bottom member 123. From their bottom ends, the generally vertical members 124 extend upward, forward and laterally inward. A bracket 135 is connected to the top ends of the vertical members 124. Side members 142 are connected to and extend upward and rearward from vertical members 114. A laterally extending member 152 is connected to the tops of the rear members 140. A laterally extending member 155 is connected between the rear members 140 below the laterally extending member 152.

The vehicle 10 includes a three-point seat belt assembly 720 for each of the seats 24, 26. The seat belt assembly 720 will be described in more detail below. The seat belt assembly 720 includes a seat belt mechanism retractor 777 and a D-ring 157 mounted to the central portion 100 of the frame 12. In an alternative implementation illustrated in FIG. 13, a four-point harness seat belt 476 is provided, with two seat belt mechanisms being provided per seat 24, 26 on the member 155.

As best seen in FIG. 12, a laterally extending member 160 extends between and connects to the side members 142. Four brackets 158 are connected to the member 160 and are used to fasten the seats 24, 26 to the central portion 100 of the frame 12. Each seat 24, 26 connects to the frame 12 via two rails 754, as will be described in more detail below.

The rails 754 are fastened at their front ends by a fastener 159 to the brackets 158 of the central portion 100 of the frame 12. Each bracket 158 includes two apertures for receiving the fastener 159, as can be seen in FIG. 12. It is contemplated that the brackets 158 could define more or less apertures. From their front ends, the rails 754 extend rearward and downward and connect at their rear ends to spacers 756. The spacers 756 connect to the frame 12 via the brackets 111 (FIG. 17). The spacers 756 are connected to their corresponding rails 754 via a metal casting 768 fixed to the corresponding rail 754. Each casting 768 provides an aperture (not shown) to receive the spacers 756 and a laterally extending aperture (not shown) to receive a fastener 770, specifically a bolt 770. It is contemplated that the spacers 756 could connect directly to the rails 754 in some implementations. It is also contemplated that the spacers 756 could be integral with the rails 754, the rails 754 being generally L-shaped and connecting directly to the brackets 111.

Figure 23:
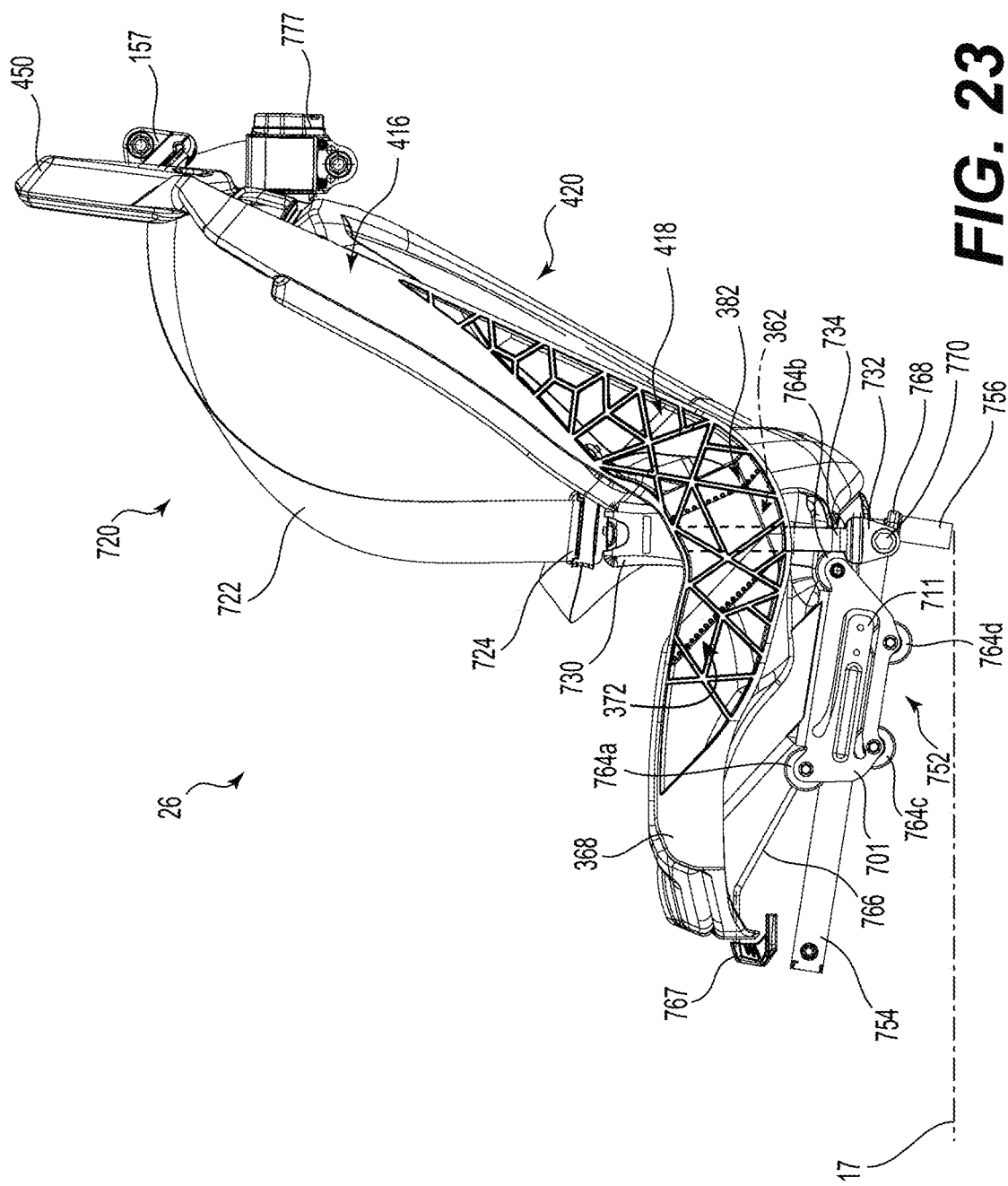
FIG. 23 is a left side elevation view of the passenger seat and its corresponding seat belt assembly of FIG. 20 and rails of the vehicle of FIG. 1, with the seat in a rearward position.
Figure 24:
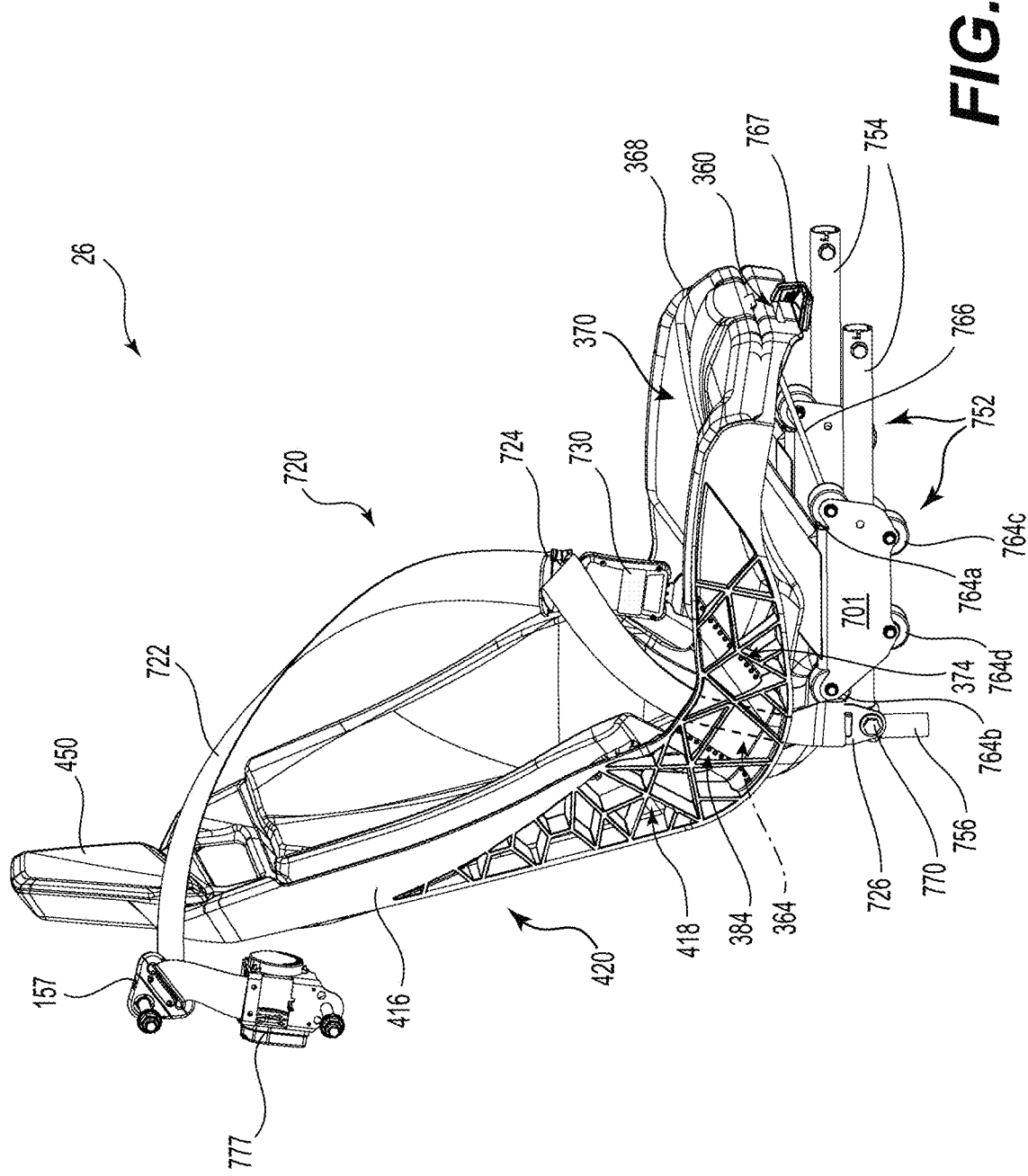
FIG. 24 is a front, right side perspective view of the passenger seat, seat belt assembly, and rails of FIG. 23, with the seat in the rearward position.
Figure 25:
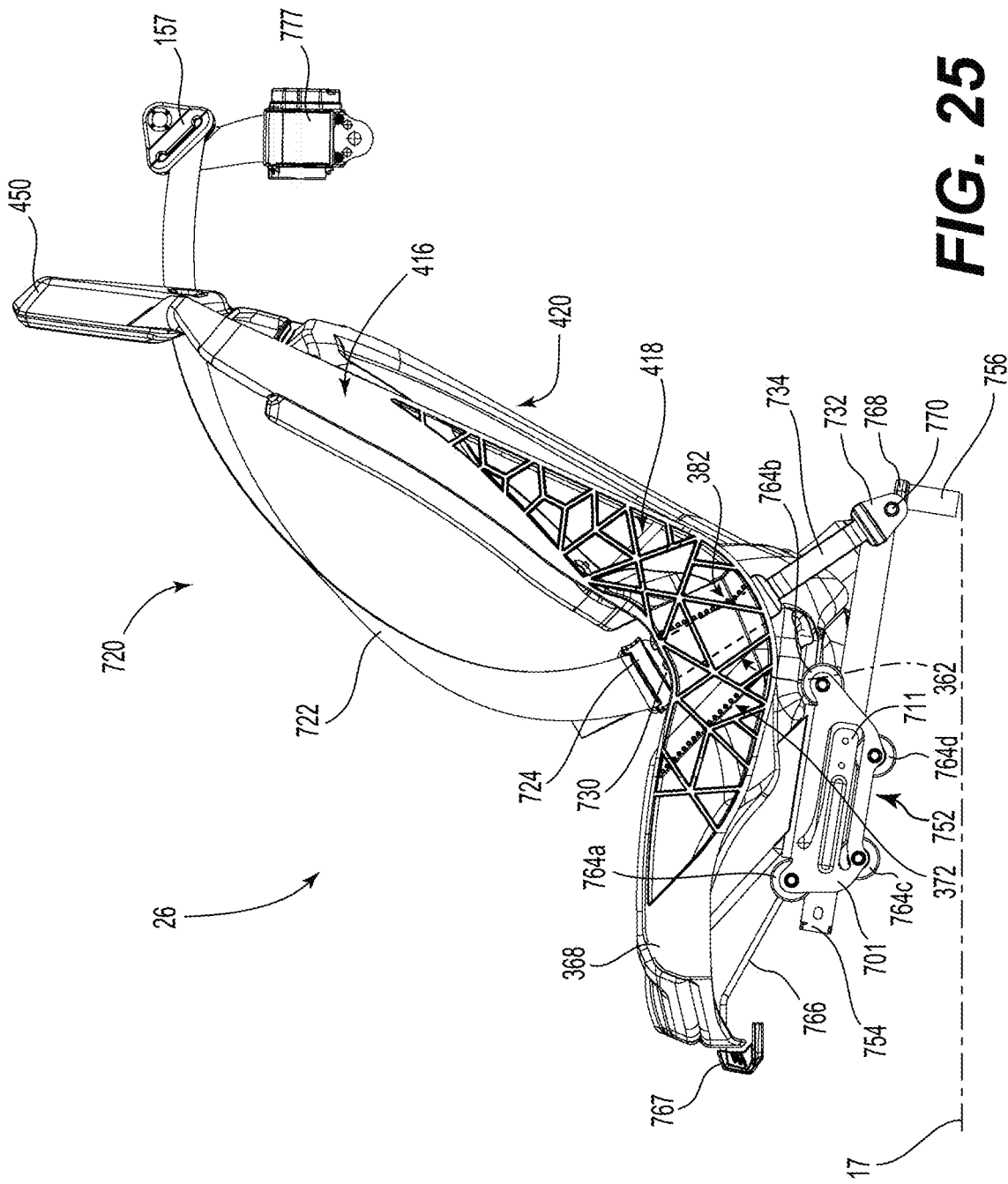
FIG. 25 is a left side elevation view of the passenger seat, seat belt assembly, and rails of FIG. 23, with the seat in a forward position.
Figure 26:
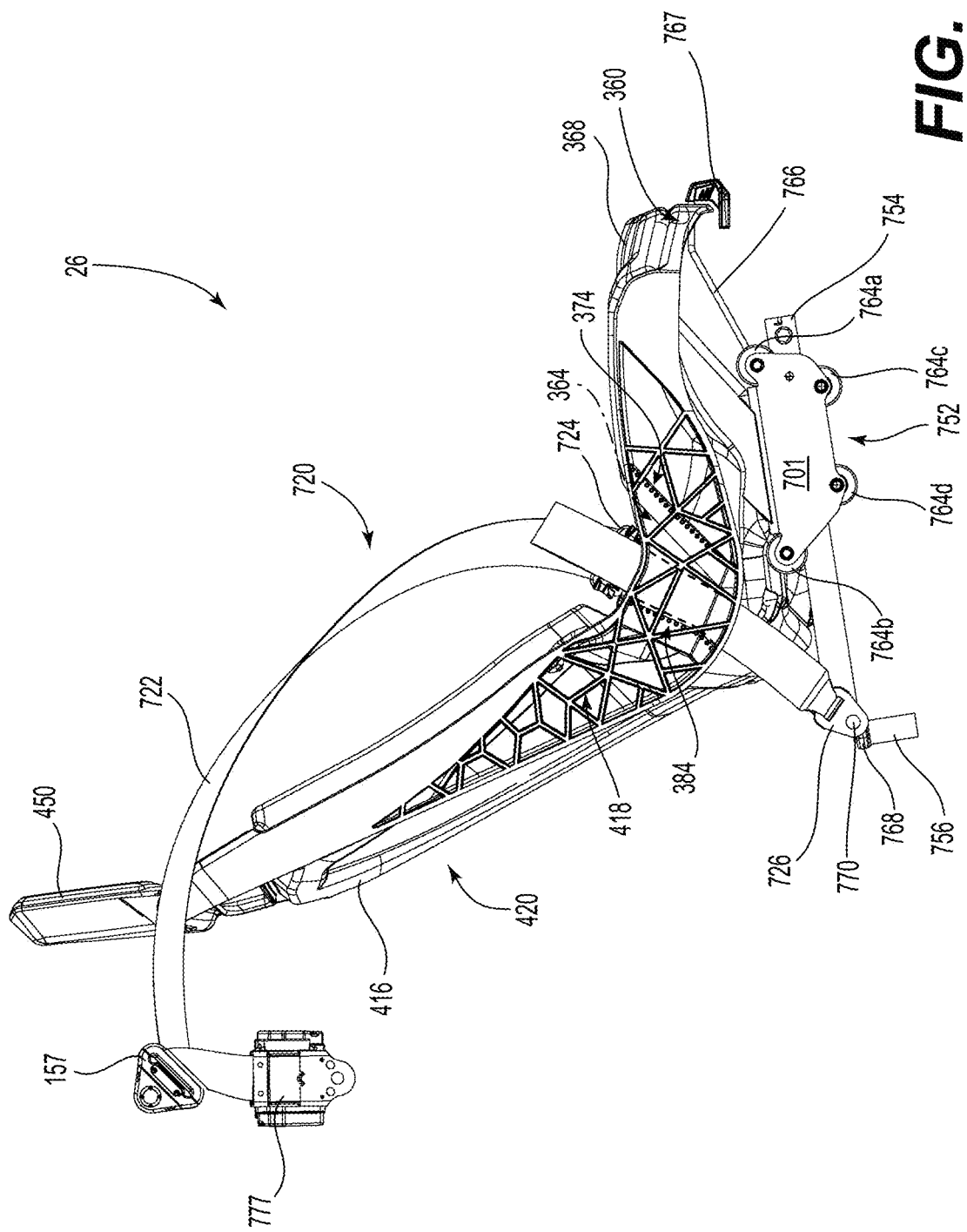
FIG. 26 is a right side elevation view of the passenger seat, seat belt assembly, and rails of FIG. 23, with the seat in the forward position.

The passenger seat 26 is shown in the rearward position in FIGS. 23 and 24 and in a forward position in FIGS. 25 and 26. As described above, the rails 754 are angled such that the front ends of the rails 754 are higher than their rear ends; a horizontal line 17 is illustrated for reference in FIGS. 23 and 25. It is contemplated that the rails 754 may be more or less angled depending on the implementation.

Due to the angle of the rails 754, the height of the each seat 24, 26 varies with the forward and rearward position adjustment, the seats 24, 26 being higher when in the forward position than when they are in the rearward position. The spacers 756, which connect the rear ends of the rails 754 to the frame may be used to adjust the height of the seats 24, 26. The spacers 756 may be disconnected from the castings 768 and the brackets 111 and replaced by similar spacers of different length in order to adjust an overall height of the each seat 24, 26. In some implementations, the vertical height of the seat 24, 26 could be adjusted by removing the spacers 756 from below the castings 768. In such an implementation, the spacers 756 could optionally then be connected on a top side of the castings 768.

When using longer spacers 756 connected to the rear end of the rail 754, the fastener 159 at the front end of the rail 754 is used with a top aperture in the bracket 158 (FIG. 17) to increase the overall height of the seats 24, 26. When using shorter spacers 756 connected to the rear end of the rail 754, the fastener 159 at the front end of the rail 754 is used with a bottom aperture in the bracket 158 to decrease the overall height of the seats 24, 26. It is contemplated that more than two sizes of spacers 756 and two apertures of the brackets 158 could be implemented to give users more height options for the seats 24, 26.

The front suspension assembly 16 is a double A-arm suspension assembly. As such, the front suspension assembly 16 includes, inter alia, a shock absorber assembly 254. The shock absorber assembly 254 includes a coil spring disposed around a hydraulic shock, and the hydraulic shock has a separate reservoir connected to it. Since shock absorber assemblies of this type are well known, the shock absorber assembly 254 will not be described in greater detail.

Corresponding pair of top connection points of the front and rear shock absorber assemblies 254, 53 each define a line 260 passing through a top portion of the cockpit area 22. Specifically, a point 262 is the point at the intersection of a pivot axis 268 of the rear shock absorber assembly 53 and a centerline 270 of the shock absorber 55 of the rear suspension assembly 20. The point 262 defines an upper connection point of the rear shock absorber assembly 53 to the frame 12. A point 264 is the point at the intersection of an upper pivot axis 272 of the front shock absorber assembly 16 and the centerline 274 of the shock absorber 254 of the front suspension assembly 16. The point 264 defines an upper connection point of the front shock absorber assembly 16 to the frame 12.

As can be seen in FIGS. 8, 9, and 12 through 15, each line 260 passes through the upper connection points of the corresponding shock absorber assemblies 254, 53, specifically through points 262 and 264. The lines 260 are disposed vertically above the steering wheel 28 and the D-rings 157 for the seat belts 776. The left line 260 is also disposed above the shoulder generally indicated by curve 266 around which the 4-point harness seat belt 476 passes when a driver of the vehicle 10 sits in the driver seat 24 in its rearmost position as shown with his back firmly against the back of the driver seat 24. The same is true with respect to the right line 260 and the should of a passenger sitting in the passenger seat 26 in its rearmost position. The curve 266 contains the shoulder reference point as defined in SAE J826 (as revised in November 2008), the entirety of which is incorporated herein by reference.

As can be seen in the top views of FIGS. 8 and 12, the right and left lines 260 extend rearward and generally outward from the points 264 to the points 262. As such, the engine 30 is disposed laterally between the right line 260 and the left line 260 (see FIG. 12). The CVT 32, disposed to the left of the engine 30, is also disposed laterally between the lines 260. See for instance FIG. 13, where the CVT 32 is shown inward of the left shock absorber assembly 53 (which defines in part the line 260) and leftward of the right shock absorber assembly 53. From this view it can also be seen that the CVT 32 is disposed below the lines 260. As can further be seen in FIG. 13, the radiator 616, which is used to cool the coolant used for cooling the engine 30 and is connected to a front of the frame 12, and the air inlet 600, which brings air to both the engine 30 and the CVT 32, are also disposed below a plane defined by the lines 260. Similarly, a rear intercooler 614, disposed at an angle laterally between and rearward of the seats 24, 26, is also disposed below the plane defined by the lines 260. This can be seen from FIGS. 14 and 15, where it can further be seen that the rear intercooler 614 and the air inlet 600 are both disposed rearward a head of the driver 400 when the driver 400 is seated in the driver seat 24, behind a head rest 450 of the driver seat 24.

Figure 18:
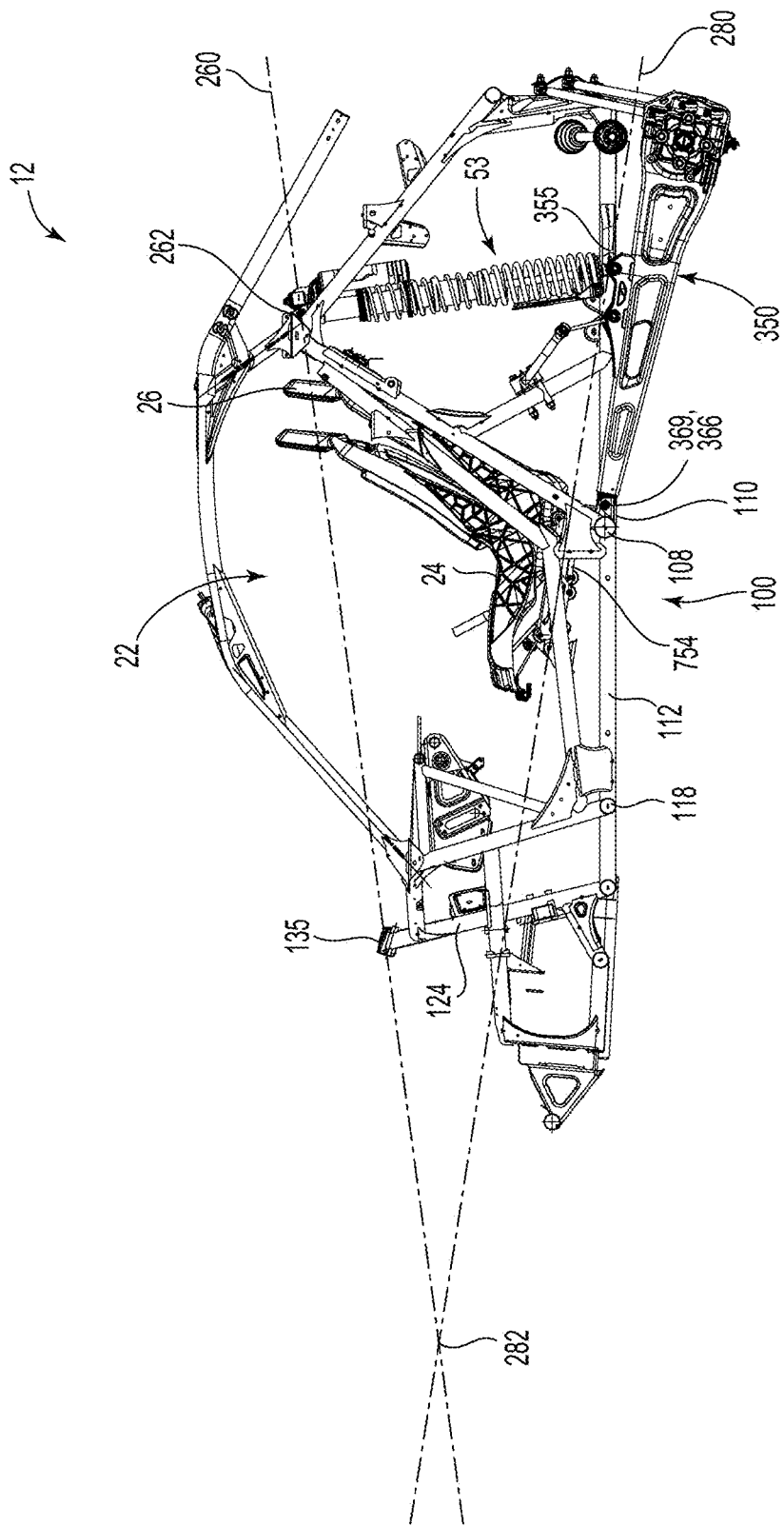
FIG. 18 is a left side elevation view of the frame, seats and rear suspension of the vehicle of FIG. 1, with a trailing arm in a bottom-most position.
Figure 19:
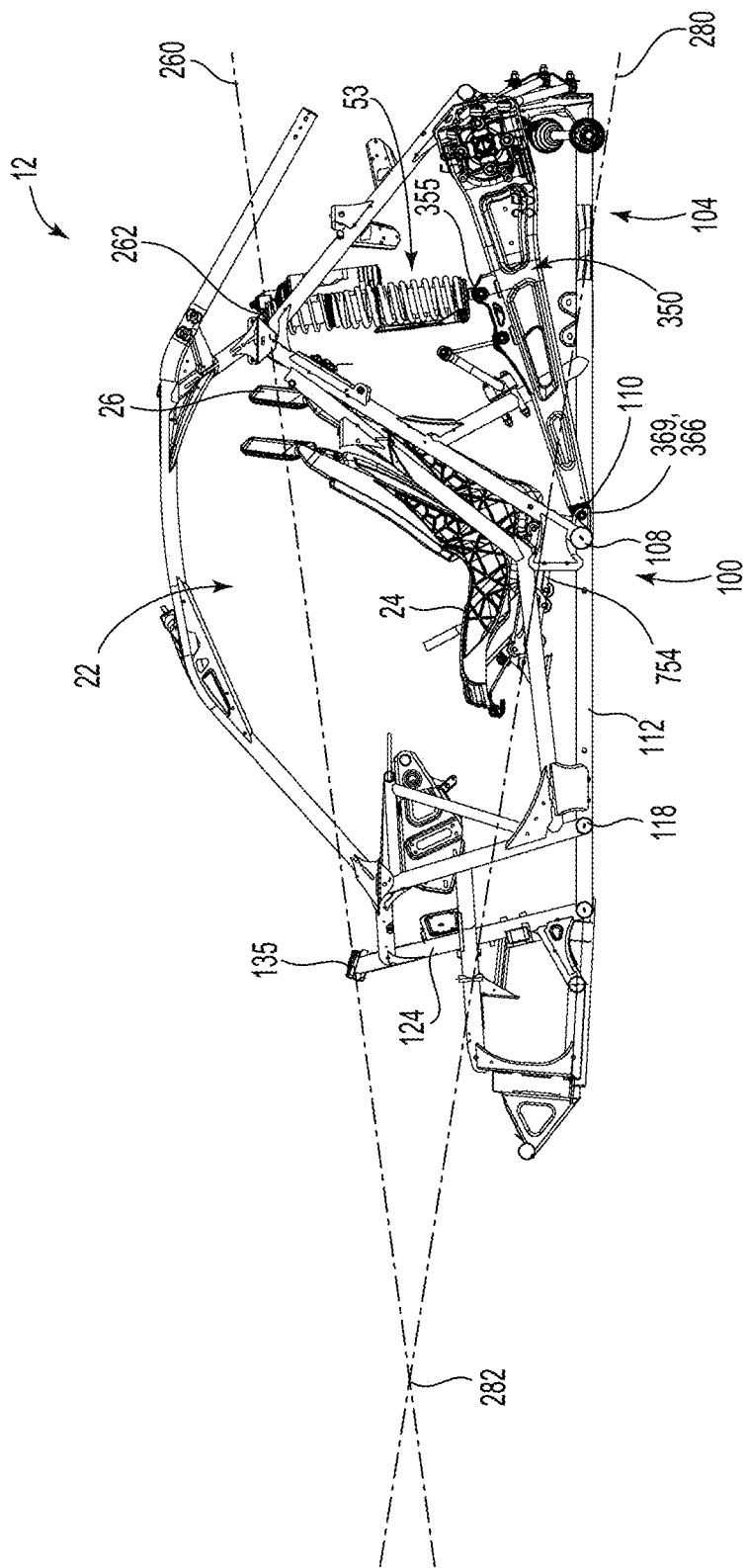
FIG. 19 is the left side elevation view of FIG. 18, with the trailing arm in a top-most position.

Referring now to FIGS. 18 and 19, another pair of lines 280 traversing the frame 12 is defined by the rails 754 (only the left line 280 being visible in the figures). The lines 280 are the axes 280 along which the seats 24, 26 are adjusted, as will be described in more detail below. As forward portions of the rails 754 are disposed vertically higher than rearward portions of the rail 754 (described in more detail below), the axes 280 extend slightly downward as they extend rearward from a front of the vehicle 10. In a projection of the axes 280 and the lines 260 on a longitudinal plane, such as the plane defined by the drawing page of FIGS. 18 and 19, the axes 280 intersect the lines 260, defined by the upper connection points 264, 262 of the shock absorber assemblies 254, 53 as described above, at a point 282. The point 282 is disposed forward of the vehicle 10.

Still referring to FIGS. 18 and 19, the two extreme positions of the trailing arms 350 are illustrated. As the left and right trailing arms 350 are mirror images of one another, only the left trailing arm 350 will be described. In FIG. 18, the rear suspension assembly 20 is in full extension, with the trailing arm 350 being generally lower than the frame 12. In this position, the connection 355 of the lower end of the shock absorber 55 to the trailing arm 350 is disposed vertically lower than the axes 280. In FIG. 19, the rear suspension assembly 20 is in its most contracted state, with the trailing arm 350 being generally higher than bottom portions of the frame 12. In this position, the connection 355 of the lower end of the shock absorber 55 to the trailing arm 350 is disposed vertically higher than the axes 280.

With reference to FIGS. 20 through 27, the driver and passenger seats 24, 26 of the vehicle 10 will now be described in more detail. The driver and passenger seats 24, 26 are mirror images of each other in the present implementation and as such the seats 24, 26 will generally be described with respect to the passenger seat 26. It is contemplated that in other implementations, the driver seat 24 could differ from the passenger seat 26 in various ways.

The seat 26 has a seat body 420 which includes a base portion 368. The seat body 420 also includes a seatback portion 416 extending at least partially upward from the base portion 368. A headrest portion 450 of the seat body 420 is disposed above and extends at least partially upward from the seatback portion 416. The base, seatback, and headrest portions 368, 416, 450 are integrally connected to form the seat body 420, which is constructed of a monocoque plastic shell to which cushions are mounted. It is contemplated that the seat body 420 could be provided with more or fewer portions. It is also contemplated that the portions 368, 416, 450 could be fastened together to form the seat body 420. It is further contemplated that the cushions could also be integrally formed with the seat body 420.

The seat body 420 also includes a plurality of rigid ribs 418 for at least partially giving structure to the seat body 420. The ribs 418 are oriented at various angles with respect to the seat body 420 and the plurality of ribs 418 extend along left and right sides of the base portion 368 and the backrest portion 416. It is contemplated that the seats 24, 26 could include more or fewer rigid ribs 418. It is also contemplated that the plurality of rigid ribs 418 could extend along more or less of the seat body 420, including extending along only one of the base portion 368 and the backrest portion 416 in some implementations. It is further contemplated that the ribs 418 could extend along only one of the left and right sides of the seat body 420. It is also contemplated that the ribs 418 could be disposed in any number of different patterns or orientations than those illustrated in the Figures.

The seat body 420 defines two apertures 362, 364 through which portions of the seat belt assembly 720 extend, specifically a buckle aperture 362 and a belt aperture 364. While the buckle aperture 362 and the belt aperture 364 are referred to as different apertures herein, in the present implementation the apertures 362, 364 are mirror-images of one another and they are distinguishable only by their use in the present implementation. It is contemplated that the two apertures 362, 364 may differ in shape or size.

In the present implementation, the apertures 362, 364 are defined in part by the base portion 368 and in part by the rigid ribs 418 extending along the seat body 420. It is contemplated that the apertures 362, 364 could be defined by only the base portion 368 and/or different portions of the seat body 420. The utility generally provided by the apertures 362, 364 will be described in more detail below.

Figure 27:
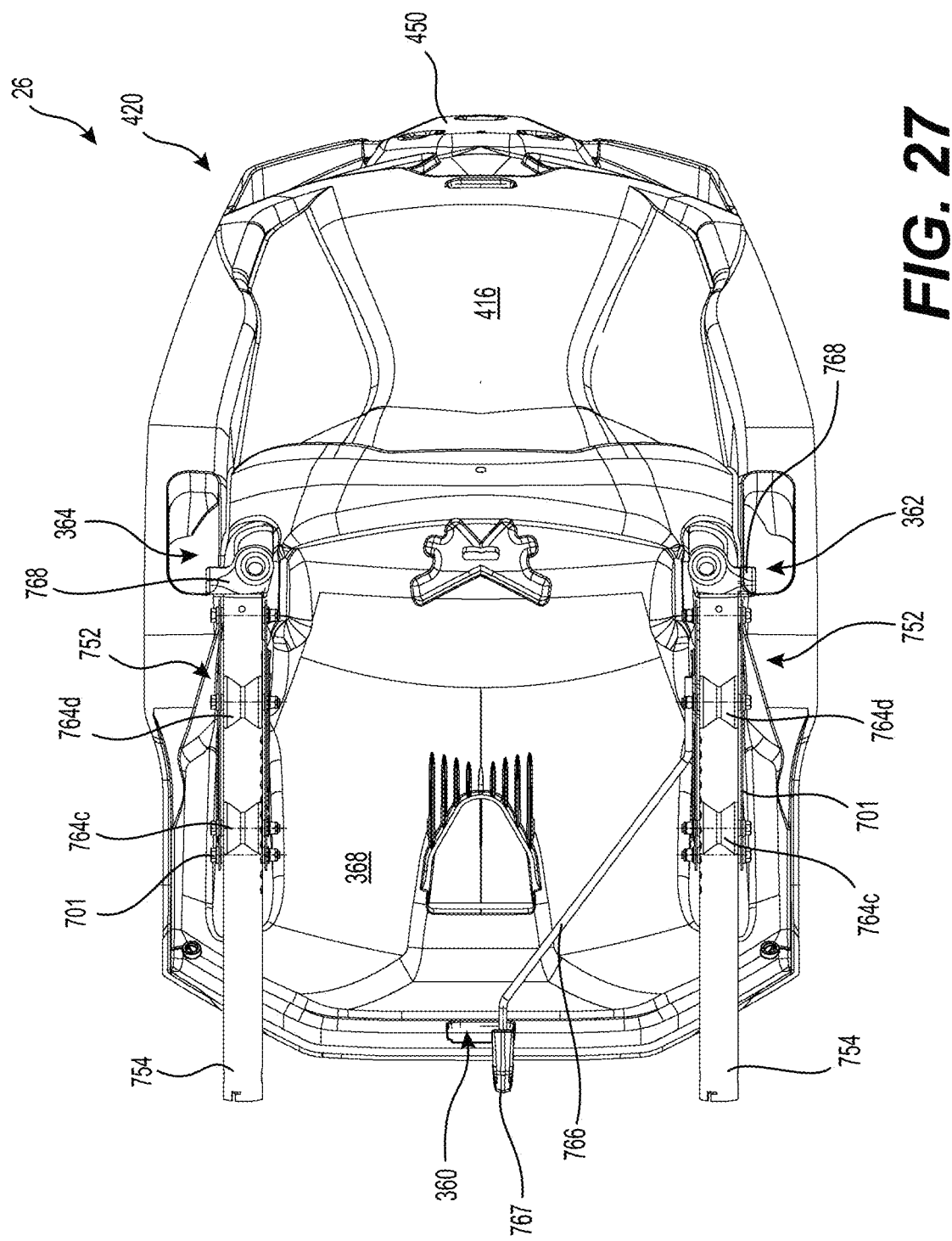
FIG. 27 is a bottom plan view of the passenger seat and rails of FIG. 23, with the seat in the rearward position and the seat belt assembly having been removed.
Figure 28:
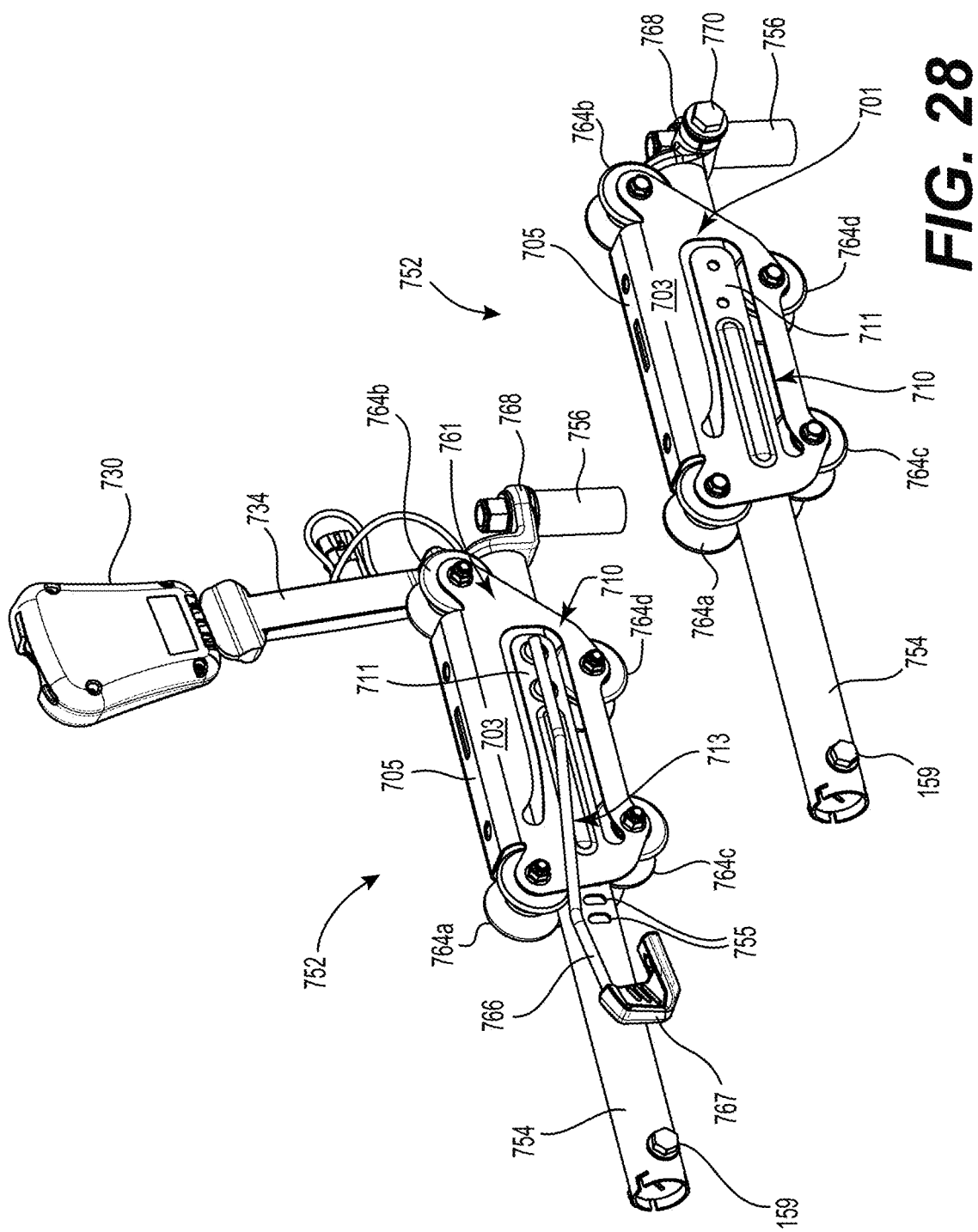
FIG. 28 is a perspective view, taken from a front, left side, of the rails and adjustment assemblies of the driver seat of the vehicle of FIG. 1.
Figure 29:
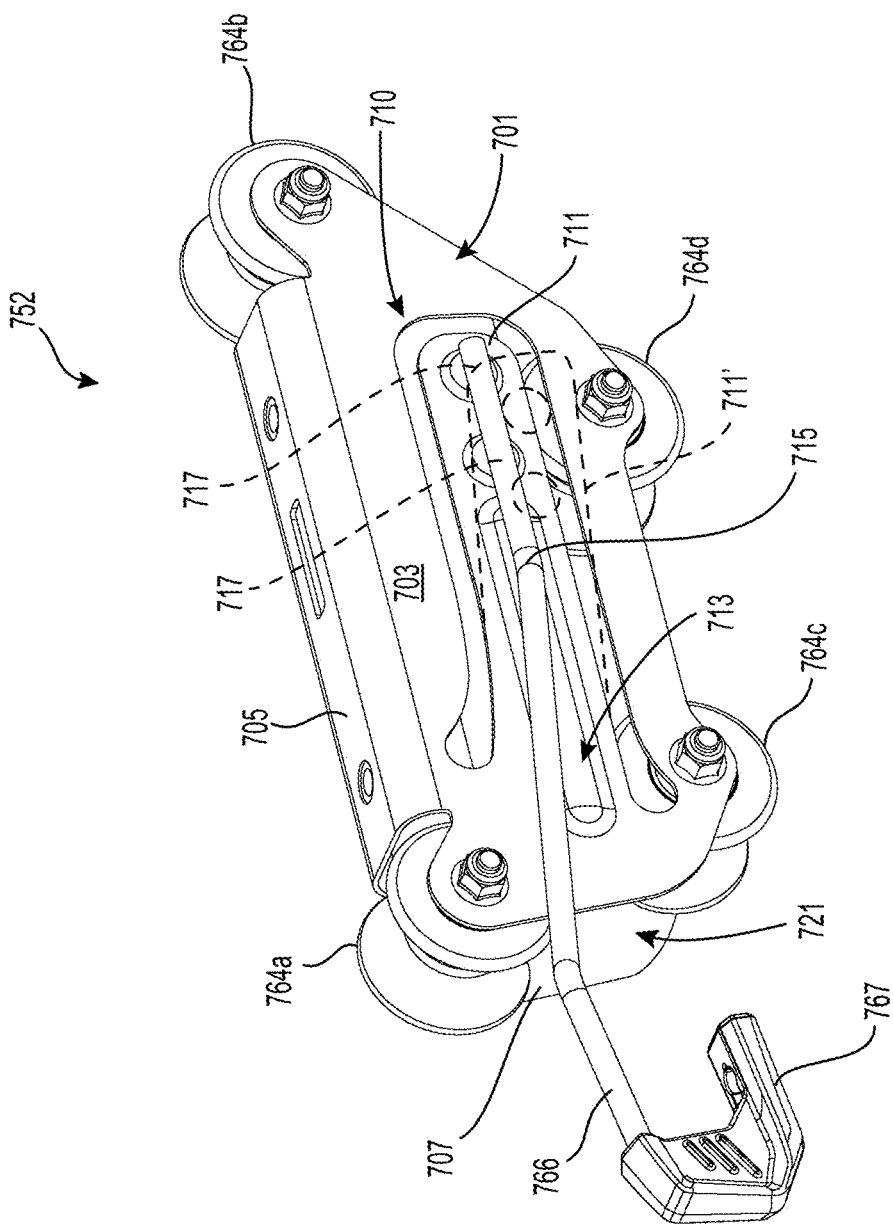
FIG. 29 is a perspective view, taken from a front, left side, of a right adjustment assembly of FIG. 28.
Figure 30:
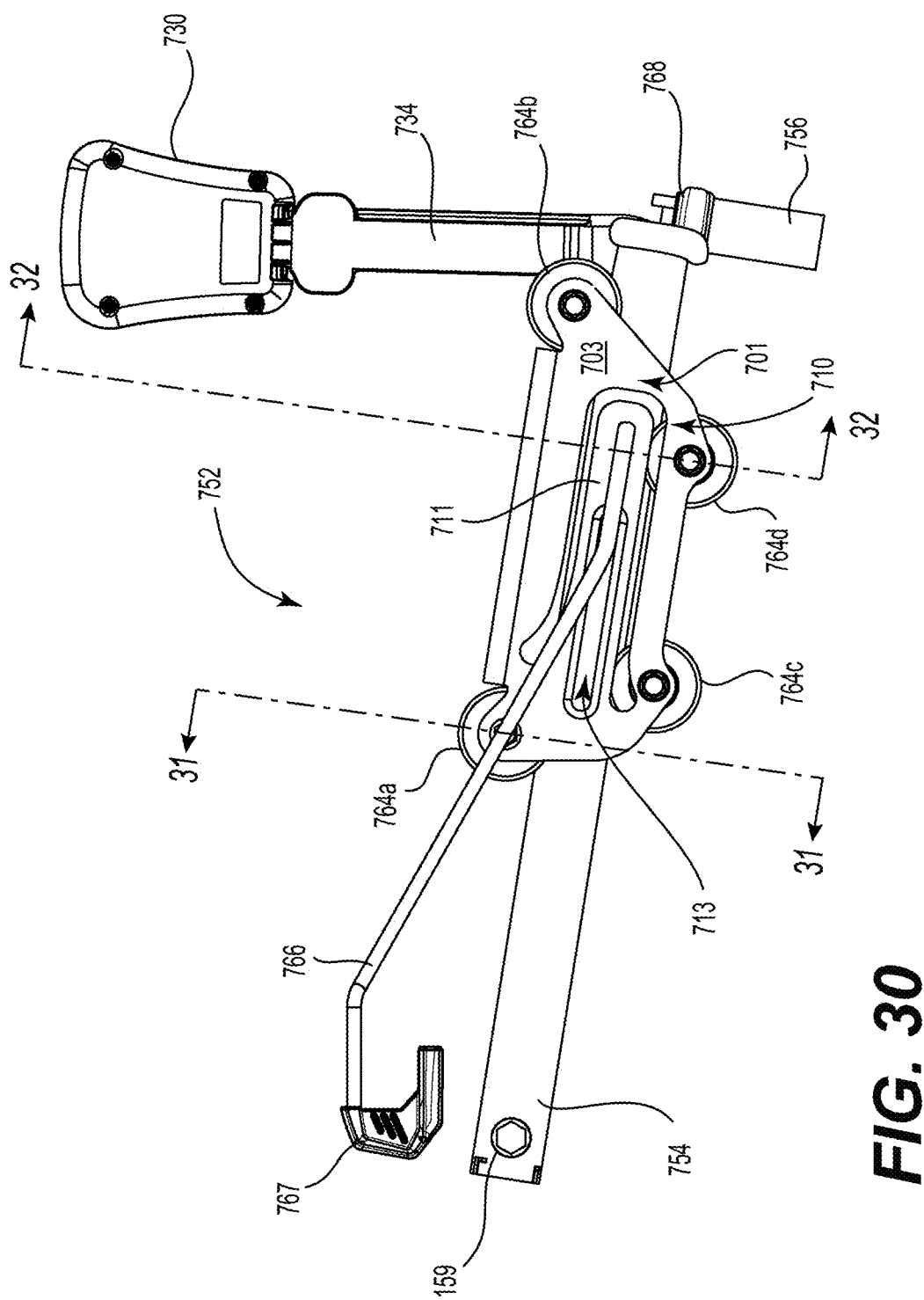
FIG. 30 is a left side elevation view of the right adjustment assembly and its corresponding rail of FIG. 28.
Figure 31:
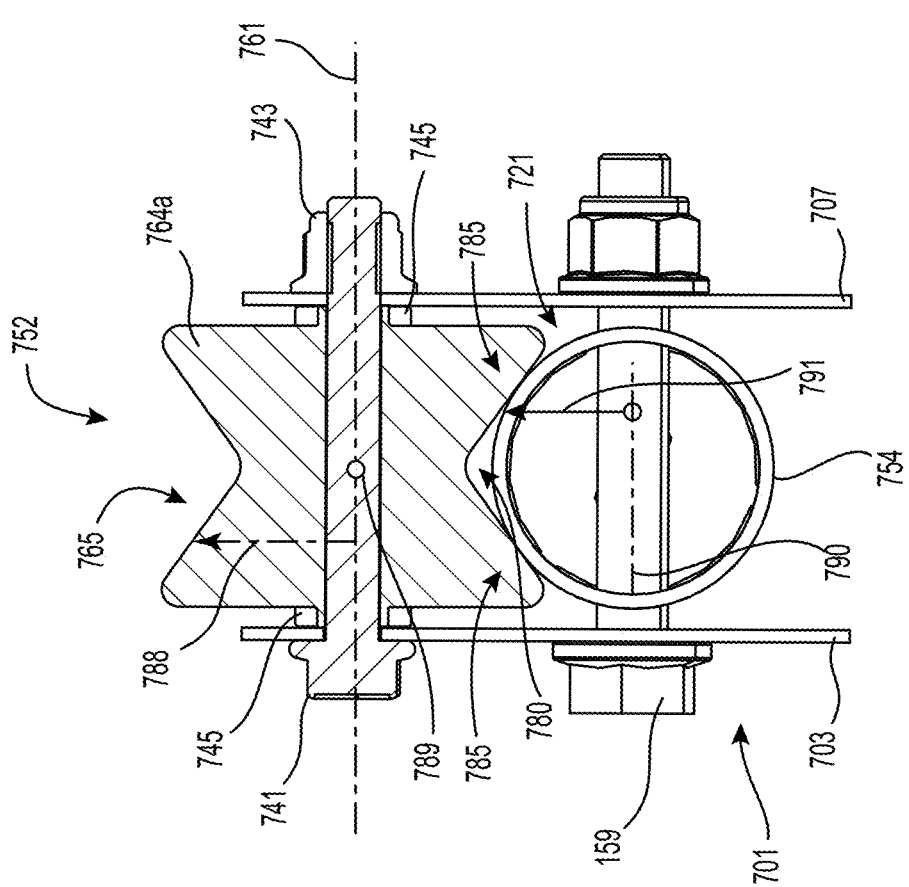
FIG. 31 is a cross-sectional view of the adjustment assembly and rail of FIG. 30, taken along line 31-31 of FIG. 30.

The seat 26 also includes two seat adjustment assemblies 752, which are mounted on the rails 754 to allow the longitudinal position of the seat 26 be adjusted. Using the assemblies 752 and rails 754, the seat 26 is translatable with respect to the frame 12, between a rearward position and a forward position, as well as several intermediate positions. In FIGS. 23, 24, and 27, the seat 26 is in the rearward position. In FIGS. 25 and 26, the seat 26 is in the forward position. The seat adjustment assemblies 752 and use of the assemblies 752 to adjust the position of the seat 26 will be described in detail below.

The vehicle 10 includes two seat belt assemblies 720, as mentioned above, one for each of the seats 24, 26. As is illustrated in FIGS. 20 to 27, portions of each seat belt assembly 720 pass through the apertures 362, 364 in its corresponding seat 24, 26. Each assembly 720 is a three-point seat belt assembly 720, with each anchoring connection of the assembly 720 connecting to the frame 12 without connecting to the seat body 420 itself.

The seat belt assembly 720 includes a seat belt 722 and a male buckle connector 724 which is slidably connected to the seat belt 722. At a top end, the seat belt 722 passes through the D-ring 157 and is connected to the seat belt retractor mechanism 777, which is connected to the frame 12 as mentioned above. As can be seen in FIG. 20, a portion of the seat belt assembly 720, specifically part of the seat belt 722 and part of the D-ring 157, extends above a top edge 418 of the back rest portion 416. It is contemplated that the D-ring 157 and portions of the seat belt 722 could be disposed higher or lower than illustrated in the present implementation.

The seat belt 722 extends downward through the belt aperture 364 to a bottom end, where the seat belt 722 is again connected to the frame 12. Specifically, the bottom end of the seat belt 722 has an anchor connection 726 which connects to the frame 12 via the metal casting 768 fixed to a rear end of one of the rails 754. The anchor connection 726 and the casting 768 are fastened together by the bolt 770, the anchor connection 726 pivoting about a center of the bolt 770. The anchor connection 726 of the seat belt 722 is connected to the right rail 754 for the passenger seat 26, and the seat belt retractor mechanism 777 is connected to the frame 12 to the right of a centerline 422 of the seat 26 and vertically higher than the anchor connection 726.

The seat belt assembly 720 further includes a female buckle receptacle 730 for receiving the male buckle connector 724. The female buckle receptacle 730 is connected at its bottom end to the frame 12 and extends generally upward from its bottom end and through the buckle aperture 362. Specifically, the female buckle receptacle 730 connects to the frame 12 via an anchor connection 732 connected to a metal casting 768 fixed to a rear end of the rail 754 opposite the rail 754 to which the seat belt anchor 726 in connected. As is illustrated in FIG. 20, the anchor connection 732 is connected to the left rail 754 for the passenger seat 26 and the anchor connection 732 is connected to the right rail 754 for the driver seat 24. The anchor connection 732 is also fastened its corresponding casting 768 by a bolt 770, the anchor connection 732 pivoting about the center of the bolt 770.

The female buckle receptacle 730 also includes a rigid stalk 734 between the top end of the receptacle 730 and the anchor 732 to keep the female buckle receptacle 730 accessible. As can be seen in FIG. 24, a portion of the female buckle receptacle 730 extends above a top surface 370 of the base portion 368. As such, the male buckle connector 724 can be inserted into the female buckle receptacle 730 without retrieving the female buckle receptacle 730 from below the top surface 370. It is contemplated that the top end of the female buckle receptacle 730 could be disposed higher or lower than illustrated in the present implementation. It is also contemplated that the female buckle receptacle 730 could be provided without the rigid stalk 734, depending on the implementation.

Figure 21:
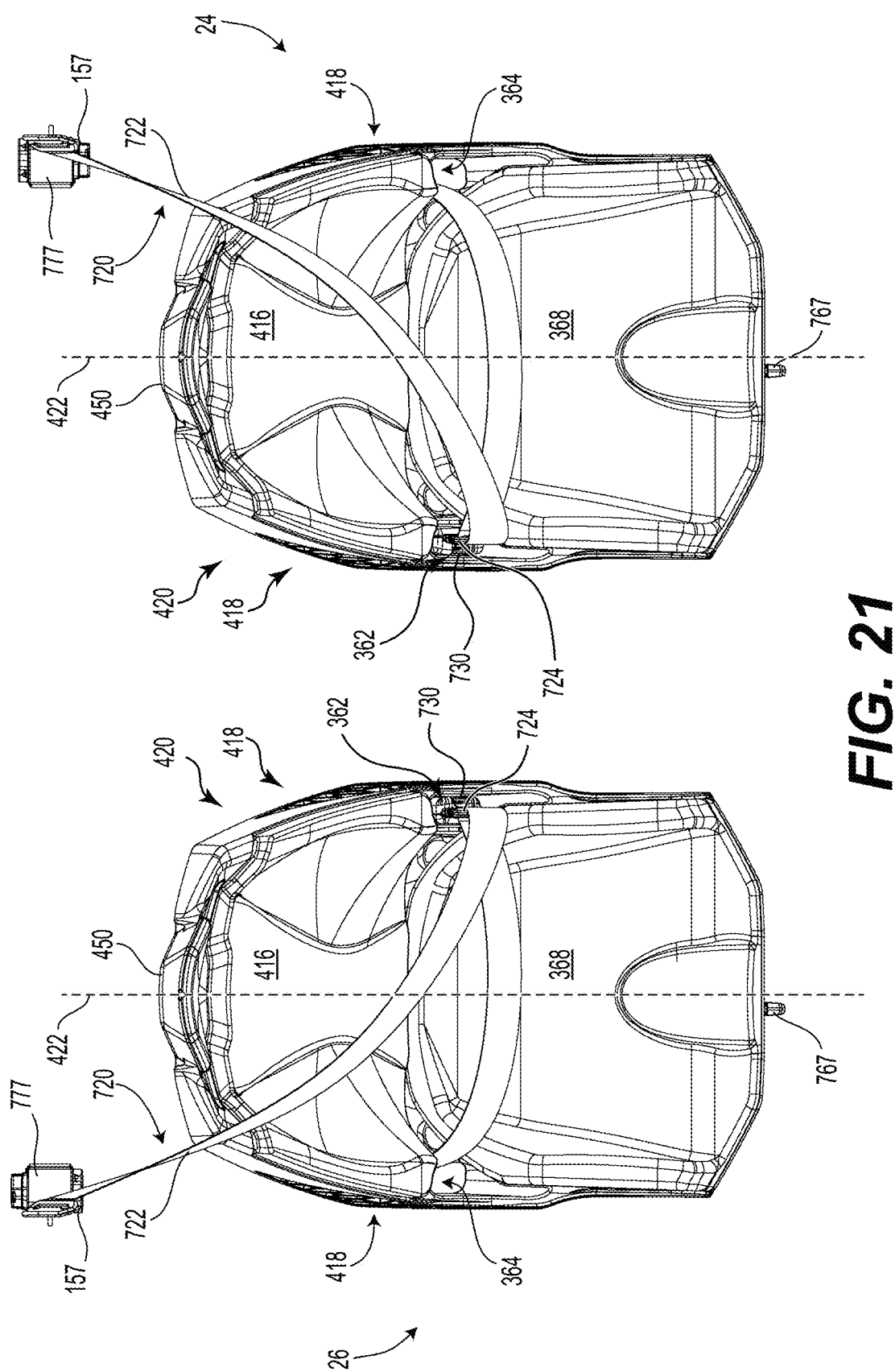
FIG. 21 is a top plan view of the seats and seat belt assemblies of FIG. 20.

As is illustrated in FIG. 21, the top end of the seat belt 722, the bottom end of the seat belt 722, and the belt aperture 364 are disposed to the right of the centerline 422 of the passenger seat 26 and the buckle aperture 362 is disposed to the left of the centerline 422. For the driver seat 24, the top end of the seat belt 722, the bottom end of the seat belt 722, and the belt aperture 364 are disposed to the left of the centerline 422 and the buckle aperture 362 is disposed to the right of the centerline 422.

For the passenger seat 26, the right casting 768 connects to the anchor connection 726 and the left casting 768 connects to the anchor connection 732 of the female receptacle 730. On the right casting 768 of the seat 24, the anchor connector 732 of the female buckle receptacle 730 is connected to the casting 768. It is contemplated that the anchor connections 726, 732 could be connected directly to the corresponding rail 754. The spacers 756 can be removed, moved, or replaced to change the vertical height of the each seat 24, 26, as mentioned above. As the castings 768 are connected to the rails 754 and the spacers 756, a vertical height of the anchor connections 726, 732 can also be modified, depending on the relative arrangement of the castings 768, rails 754, spacers 756, and anchor connections 726, 732.

Even though the seats 24, 26 are adjustable and the seat belt assemblies 720 are connected to the frame 12 and not to the seats 24, 26, the seat belt assemblies 720 are still operable whether the seats 24, 26 are in a forward position, a rearward position, or in an intermediate position between the forward and rearward positions. As can be seen in FIGS. 23 to 26, the apertures 362, 364 and the pivoting anchor connections 726, 732 are sized and arranged such that the seat belt 722 and the female buckle receptacle 730 extend through the apertures 362, 364 for all forward to rearward positions of the seat 24, 26. In the forward position (FIGS. 23 and 24), the rearward position (FIGS. 25 and 26), and the intermediate positions (not shown), the male buckle connector 724 and the female buckle receptacle 730 can be connected to each other.

Figure 22:
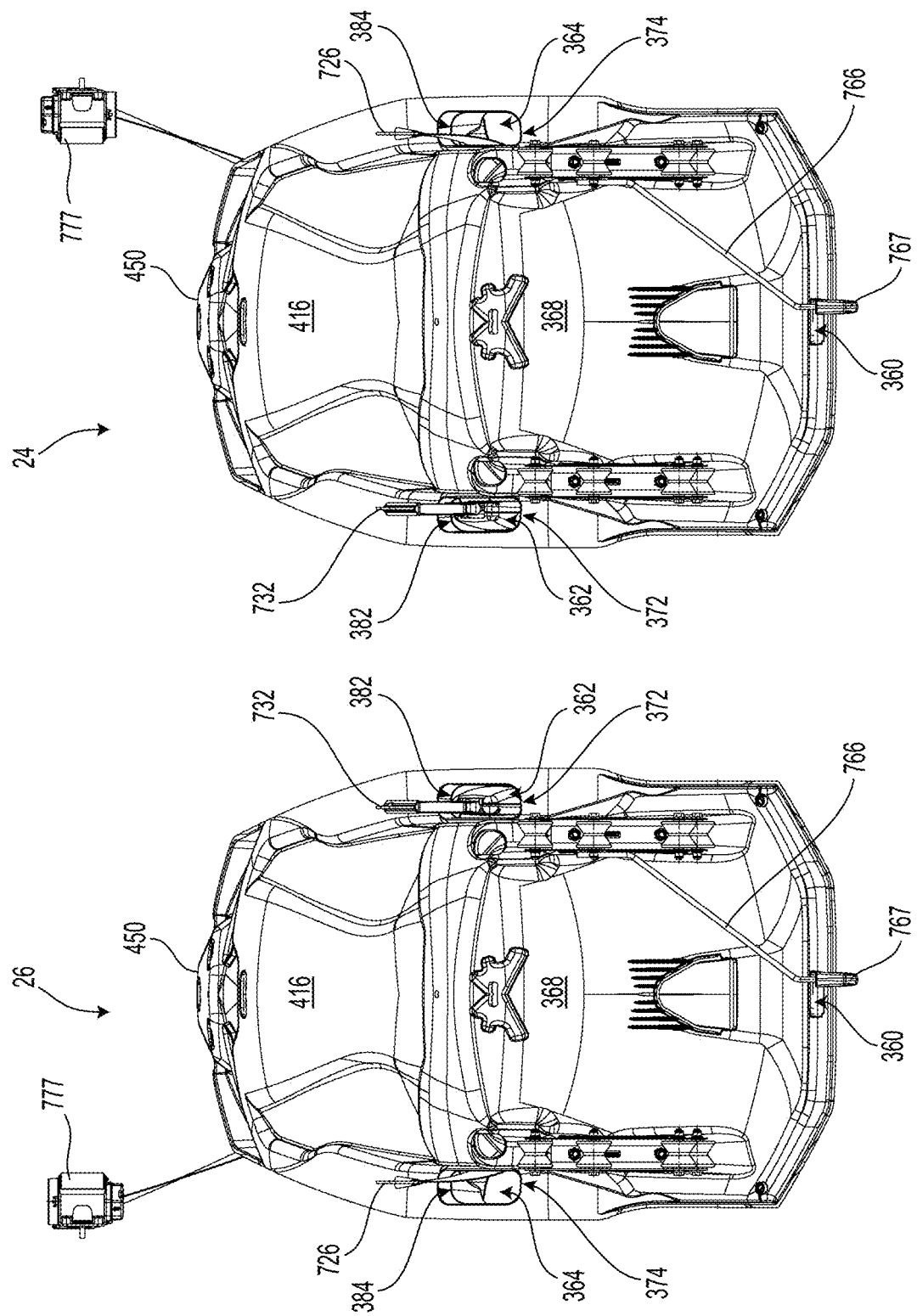
FIG. 22 is a bottom plan view of the seats and seat belt assemblies of FIG. 20.

When the seat 26 is in the forward position, the portion of the seat belt 722 extending through the belt aperture 364 is forward of and spaced from a rear edge 384 of the belt aperture 364 and the portion of the female buckle receptacle 730 extending through the buckle aperture 362 is forward of and spaced from a rear edge 382 of the buckle aperture 362. Similarly, when the seat 26 is the rearward position, the portion of the seat belt 722 extending through the belt aperture 364 is rearward of and spaced from a front edge 374 of the belt aperture 364 and the portion of the female buckle receptacle 730 extending through the buckle aperture 362 is rearward of and spaced from a front edge 372 of the buckle aperture 362. The boundaries of the apertures 362, 364 are illustrated in FIG. 22, and schematically outlined in FIGS. 23 to 26.

By connecting the seat belt assemblies 720 to the frame 12, without being connected directly to either seat body 420, the seats 24, 26 do not need to support loads from the seat belt assembly 720. Hence the seats 24, 26 may be constructed to be more lightweight, and/or may cost less to be fabricated, in some implementations, than otherwise might be the case if the seat bodies 420 were required to support the loads of the seat belt assemblies 720. By passing portions of the seat belt assemblies 720 through the apertures 362, 364, the seat belt assemblies 720 and the seats 24, 26 connect to the frame 12 at similar lateral locations in the vehicle 10, which aids in limiting an overall lateral width of the vehicle 10. If instead the seat belt assemblies 720 connected to the frame 12 around the full lateral width of the seats 24, 26, for instance, the overall width of the vehicle 10 would need to be larger.

The seat adjustment assemblies 752 will now be described in more detail with reference to FIGS. 27 to 32, the rails 754 and seat adjustment assemblies 752 of the driver seat 24 being displayed isolated from the seat 24. Each seat 24, 26 includes two seat adjustment assemblies 752 connected to the base portion 368 of each seat 24, 26, as mentioned above. The assemblies 752 are disposed on left and right sides of each seat 24, 26. In the rearward position (FIGS. 23 and 24), the seat adjustment assemblies 752 are near the rear ends of the rails 754. In FIGS. 25 and 26, the seat 26 is shown in a forward position where the seat adjustment assemblies 752 are near the front ends of the rails 754.

Each seat adjustment assembly 752 has an assembly frame 701 which connects to the seat bottom 368 of its corresponding seat 24, 26. The assembly frame 701 includes a left wall 703, a right wall 707, and a top wall 705 extending between the left and right walls 703, 707. It is contemplated that the assembly frame 701 could be composed of less or more walls. For example, it is contemplated that the assembly frame 701 could be composed of only the left wall 703 and the right wall 707, the walls 703, 707 being joined together by fasteners and spacers. The left and right walls 703, 707 of the assembly frame 701 each include a partially flexible tongue 711 defined by a channel 710 cut into the walls 703, 707, the use of which will be described below. The assembly frame 701 is made of metal such as stainless steel. It is contemplated that the assembly frame 701 could be composed of different materials, including but not limited to, plastic, aluminum, and hardened rubber, or any combination thereof.

Each seat adjustment assembly 752 includes two rollers 764a,b to be disposed on top of the rail 754 and two rollers 764c,d to be disposed under the rail 754. The assembly frame 701 and the rollers 764a-d define a cavity 721, best seen in FIG. 32, through which the corresponding rail 754 passes. The rollers 764a-d contact and roll along the rails 754 and as such, the seat adjustment assemblies 752 allow the seats 24, 26 to be moved independently from each other along the rails 754 between various positions. The rollers 764a,b on top of the rail 754 include a forward roller 764a and a rearward roller 764b and the rollers 764c,d below the rail 754 include a forward roller 764c and a rearward roller 764d. As can best be seen from FIG. 20, the forward and rearward rollers 764a,b above the rail 754 are separated by a greater distance than the forward and rearward rollers 764c,d below the rail 754. It is contemplated that the each of the forward rollers 764a,c and the rearward rollers 764b,d could be separated by greater or lesser distances, depending on the implementation.

It is contemplated that each assembly 752 could include more or less rollers 764a-d above and/or below the rail 754. In some implementations, additional seat adjustment assemblies 752 could be connected to the seats 24, 26. For instance, in place of one seat adjustment assembly 752 with four rollers 764a-d per side of the seat 24, 26, some implementations may include two separate seat assemblies 752 per side mounted on the same rail 754, each having two rollers 764, one roller 764 above the rail 754 and one roller 764 below. It is further contemplated that only one seat adjustment assembly 752 could be included in some implementations, with a different mechanism used for the opposite side of the seat 24, 26 and its corresponding rail 754.

Figure 32:
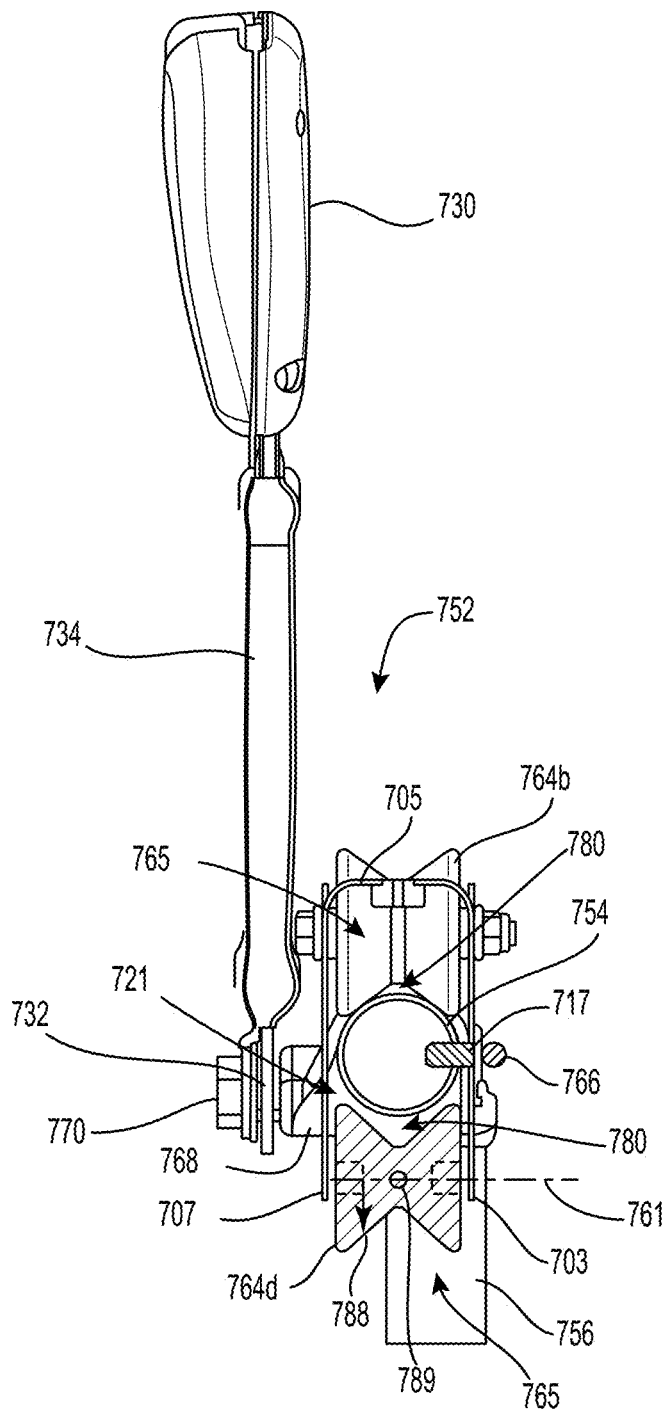
FIG. 32 is a cross-sectional view of the adjustment assembly and rail of FIG. 30, taken along line 32-32 of FIG. 30.

In order to maintain the seats 24, 26 in position, each of the seats 24, 26 is provided with two pins 717, one pin 717 being seen in FIG. 32 for the right seat adjustment assembly 752. In some implementations, each of the seats 24, 26 could be provided with a single pin 717. The pins 717 enter two of a plurality of corresponding apertures 755 in the right rail 754. The pins 717 are connected to the tongue 711 of the left wall 703 of the right adjustment assembly 752 and extends into the cavity 721, one pin 717 being illustrated in FIG. 32. The rod 766, described in further detail below, is connected to the tongue 711 to which the pins 717 are connected.

Both the walls 703, 707 of the left and right assemblies 752 of the seat 24 include the tongue 711 for simplicity of manufacturing. As can be seen in FIGS. 20 and 23 to 26, only the left walls 703 of the adjustment assemblies 752 of the passenger seat 26 include the tongue 711, although only the right adjustment assembly 752 includes the rod 766 and the pins 717. It is contemplated that only one wall 703, 705 of one of the adjustment assemblies 752 could define the tongue 711. It is also contemplated that the tongue 711 could be defined in the right wall 707 of the left adjustment assembly 752 in implementations where the rod 766 is connected to the left adjustment assembly 752. It is further contemplated that the tongue 711 could be defined in the left wall 703 of the right adjustment assembly 752 and the right wall 707 of the left adjustment assembly 752, thereby providing two options where the rod 766 could be connected.

The right rail 754 defines a series of apertures 755 spaced along the length of the rail 754, such that the pins 717, when aligned with corresponding apertures 755, can enter through the apertures 755 into an interior of the right rail 754. The pins 717 extending into the rail 754 through the apertures 755 prevent movement of the seat adjustment assembly 752 with respect to the rail 754, and thus movement of the other corresponding adjustment assembly 752 of the corresponding seat 24, 26. It is contemplated that both rails 754 of each seat 24, 26 may define the apertures 755 for ease of manufacturing. It is also contemplated that the apertures 755 could be defined in both sides of either or both of the rails 754 for ease of assembly. It is also contemplated that the left rail 754 may define the apertures 755 in implementations where the left seat adjustment assembly 752 is provided with the rod 766 and the pin 717.

The forward extending rod 766 is provided for changing the position of the seats 24, 26. The rod 766 is connected to the tongue 711 defined in the left wall 703 of the right side adjustment assembly 752. The tongue 711 is partially flexible and flexes about a flex region 713 when the rod 766 is pushed generally to the right. A flexed tongue 711' is shown in dashed lines in FIG. 19. The rod 766 is connected to the tongue 711 at a connection point 715 (FIG. 29) disposed longitudinally between the pin 717 and the flex region 713, such that the flexing of the tongue 711 when the user pushes the rod 766 sufficiently laterally causes the pin 717 to exit the cavity 721 and to exit the rail 754. The connection point 715 works similarly to a fulcrum point, flexing the rear end of the tongue 711, with the pin 717, generally to the left when the rod 766 is pushed to the right.

The rod 766 includes a handle 767 at a front end of the rod 766 to enable easier gripping of the rod 766 by the user. The front of the rod 766 extends through a slot 360 defined in the base portion 368. The slot 360 limits lateral motion of the front of the rod 766 to prevent over extension of the tongue 711. In some implementations, the seat body 420 could not be provided with the slot 360 and the rod 766 could pass under the seat body 420.

In order to change a position of its corresponding seat 24 or 26, the rod 766 is pushed/pulled by a user generally rightward to disengage the pin 717 on the tongue 711 from the aperture 755 in the left side of the right rail 754. The seat 24 or 26 is then moved on the rails 754 to a desired position, and the rod 766 is released such that the pin 717 on the rod 766 is inserted into another aperture 755 in the right rail 754 with which it is aligned.

Details of the rollers 764a-d will now be described with respect to FIGS. 21 and 22, where one roller 764a/d and the rail 754 are shown in cross-section in each figure. The bottom rollers 764c,d can also be seen from below in FIG. 16 and a front view of the roller 764b is also shown in FIG. 22. Each roller 764a-d is rotatably connected to the right wall 703 and the left wall 707. Each roller 764a-d rotates about a rotation axis 761 passing through a center of the roller 764a-d. Each roller 764a-d is connected to the walls 703, 707 by a bolt 741, nut 743 and two washers 745 placed between the roller 764a-d and the walls 703, 707 (see FIG. 21). It is contemplated that the rollers 764a-d could be connected to the walls 703, 707 by another mechanism, such as a different type of fastener.

Each roller 764a-d has a surface 765 that is rotationally symmetric about the rotation axis 761 and can generally be described with respect to a radius 788 measured orthogonally from the axis 761 to the surface 765. The radius 788 is at a minimum near a mid-point 789 between the right and left walls 703, 707, at a lateral center of the roller 764a-d. The radius 788 generally linearly increases at increasing distances from the mid-point 789. As seen in cross-section in FIGS. 21 and 22, the shape of the surface 765 on one half of the roller 764a-d generally forms a V-shape. It is contemplated that the radius 788 could generally increase non-linearly at increasing distances from the mid-point 789. It is also contemplated that the radius 788 could generally increase and then subsequently decrease at increasing distances from the mid-point 789, or follow some other more complicated pattern.

The shape of the surface 765 can also be described with respect to a distance 791 between an axis 790 passing through a center of the rail 754 and the surface 765. Near the mid-point 789, the distance 791 is generally at a maximum, with the distance 791 generally linearly decreasing at increasing distances from the mid-point 789. At its maximum, the distance 791 is greater than a height of the rail 754 from the axis 790. At other points, the distance 791 is equal to the height of the rail 754 from the axis 790, thus the surface 765 and the rail 754 are in contact at these points.

The shape of the surface 765, as described above, is such that each roller 764a-d and the rail 754 form a passage 780 between the roller 764a-d and the rail 754. The passage 780 allows some material and debris that may be introduced into the adjustment assembly 752 to pass between the roller 764a-d and the rail 754, reducing the possibility that the roller 764a-d and the rail 754 will become jammed by the material or debris. Specifically, because the radius 788 at the mid-point 789 is less than the distance between the rotation axis 761 and the rail 754, there is space between the face 765 and the rail 754 mid-way between the right and left walls 703, 707. Each roller 764a-d contacts the rail 754 at contact regions 785 on its surface 765 on either side of the mid-point 789, forming the passage 780 between the rail 754 and the roller 764a-d.

All the rollers 764a-d are identically shaped, however it is contemplated that some of the rollers 764a-d could have different shapes according to different implementations of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A vehicle comprising:
   a frame;
   a plurality of ground engaging members operatively connected to the frame;
   a motor operatively connected to at least one of the ground engaging members; and
   at least one seat connected to the frame and being translatable with respect to the frame between at least a forward position and a rearward position, the at least one seat including:
      a seat body defining:
         a belt aperture, and
         a buckle aperture, the belt aperture being disposed to one side of a centerline of the at least one seat, the buckle aperture being disposed to an other side of the centerline of the at least one seat;

the seat body comprising:
 a base portion defining at least a portion of:
  the belt aperture, and
  the buckle aperture;
 a backrest portion extending at least partially upward from the base portion; and
 a headrest portion extending at least partially upward from the backrest portion, and at least one seat belt assembly connected to the frame and including:
 a seat belt extending through the belt aperture of the seat body of the at least one seat and having an end connected to the frame,
 a male buckle connector slidably connected to the seat belt, and
 a female buckle receptacle for receiving the male buckle connector, the female buckle receptacle extending through the buckle aperture of the seat body of the at least one seat and having an end connected to the frame, the at least one seat belt assembly being operable with the at least one seat when the at least one seat is in at least both of the forward position and the rearward position.

2. The vehicle of claim 1, wherein:
the end of the seat belt is pivotably connected to the frame; and
the end of the female buckle receptacle is pivotably connected to the frame.

3. The vehicle of claim 1, wherein the base portion, the backrest portion, and the headrest portion are integrally connected in a monocoque seat structure.

4. The vehicle of claim 1, wherein:
the backrest portion has a top edge; and
at least a portion of the at least one seat belt assembly extends above the top edge of the backrest portion.

5. The vehicle of claim 1, wherein:
the base portion of the at least one seat has a top surface; and
at least a portion of the female buckle receptacle extends above the top surface of the base portion.

6. The vehicle of claim 1, wherein the at least one seat includes a plurality of rigid ribs extending along at least a portion of right and left sides of the at least one seat.

7. The vehicle of claim 6, wherein the plurality of rigid ribs extend along at least a portion of the base portion and the backrest portion of the at least one seat.

8. The vehicle of claim 6, wherein the plurality of rigid ribs define at least a portion of the buckle aperture and the belt aperture.

9. A vehicle comprising:
a frame;
a plurality of ground engaging members operatively connected to the frame;
a motor operatively connected to at least one of the ground engaging members; and
at least one seat connected to the frame and being translatable with respect to the frame between at least a forward position and a rearward position, the at least one seat including:
 a seat body defining:
  a belt aperture, and
  a buckle aperture; and at least one seat belt assembly connected to the frame and including:
 a seat belt extending through the belt aperture of the seat body of the at least one seat and having an end connected to the frame,
 a male buckle connector slidably connected to the seat belt, and
 a female buckle receptacle for receiving the male buckle connector, the female buckle receptacle extending through the buckle aperture of the seat body of the at least one seat and having an end connected to the frame, the at least one seat belt assembly being operable with the at least one seat when the at least one seat is in at least both of the forward position and the rearward position, and wherein:
 the belt aperture has at least a rear edge;
 the buckle aperture has at least a rear edge; and
 when the at least one seat is in the forward position:
  a portion of the seat belt extending through the belt aperture is forward of and spaced from the rear edge of the belt aperture, and
  a portion of the female buckle receptacle extending through the buckle aperture is forward of and spaced from the rear edge of the buckle aperture.

10. A vehicle comprising:
a frame;
a plurality of ground engaging members operatively connected to the frame;
a motor operatively connected to at least one of the ground engaging members; and
at least one seat connected to the frame and being translatable with respect to the frame between at least a forward position and a rearward position, the at least one seat including:
 a seat body defining:
  a belt aperture, and
  a buckle aperture; and at least one seat belt assembly connected to the frame and including:
 a seat belt extending through the belt aperture of the seat body of the at least one seat and having an end connected to the frame,
 a male buckle connector slidably connected to the seat belt, and
 a female buckle receptacle for receiving the male buckle connector, the female buckle receptacle extending through the buckle aperture of the seat body of the at least one seat and having an end connected to the frame, the at least one seat belt assembly being operable with the at least one seat when the at least one seat is in at least both of the forward position and the rearward position, and wherein:
 the belt aperture has at least a front edge;
 the buckle aperture has at least a front edge; and
 when the at least one seat is the rearward position:
  a portion of the seat belt extending through the belt aperture is rearward of and spaced from the front edge of the belt aperture, and
  a portion of the female buckle receptacle extending through the buckle aperture is rearward of and spaced from the front edge of the buckle aperture.

11. A vehicle comprising:
a frame;

a first rail connected to the frame;
a second rail connected to the frame;
a plurality of ground engaging members operatively connected to the frame;
a motor operatively connected to at least one of the ground engaging members; and
at least one seat connected to the frame and being translatable with respect to the frame between at least a forward position and a rearward position, the at least one seat including:
 a seat body defining:
  a belt aperture; and
  a buckle aperture,
   the belt aperture being disposed to one side of a centerline of the at least one seat,
   the buckle aperture being disposed to an other side of the centerline of the at least one seat;
  a first roller assembly connected to the seat body,
  a second roller assembly connected to the seat body on a side of the seat body opposite the first roller assembly;
  the first rail passing through the first roller assembly;
  the second rail passing through the second roller assembly; and
at least one seat belt assembly connected to the frame and including:
 a seat belt extending through the belt aperture of the seat body of the at least one seat and having an end connected to the frame;
 a male buckle connector slidably connected to the seat belt; and
 a female buckle receptacle for receiving the male buckle connector, the female buckle receptacle extending through the buckle aperture of the seat body of the at least one seat and having an end connected to the frame,
the at least one seat belt assembly being operable with the at least one seat when the at least one seat is in at least both of the forward position and the rearward position;
the first rail and the second rail supporting the at least one seat via the first roller assembly and the second roller assembly;
the at least one seat being translatable with respect to the frame via the first and second roller assemblies rolling on the first and second rails;
the end of the seat belt being pivotably connected to the first rail; and
the end of the female buckle receptacle being pivotably connected to the second rail.

12. The vehicle of claim 11, wherein:
the end of the seat belt is pivotably connected to the first rail rearward of a rearward most roller of the first roller assembly; and
the end of the female buckle receptacle is pivotably connected to the second rail rearward of a rearward most roller of the second roller assembly.

13. The vehicle of claim 11, wherein:
the end of the seat belt is pivotably connected to a casting fixed to a rear end of the first rail; and
the end of the female buckle receptacle is pivotably connected to a casting fixed to a rear end of the second rail.

14. The vehicle of claim 11, wherein:
a front end of the first rail is higher than a rear end of the first rail;
a front end of the second rail is higher than a rear end of the second rail; and
the seat is higher when in the forward position than when in the rearward position,
the forward position being defined when the at least one seat is near the front end of the first rail and the second rail, the rearward position being defined when the at least one seat is near the rear end of the first rail and the second rail.

15. The vehicle of claim 11, wherein:
at least one of the first roller assembly and the second roller assembly includes an adjustment rod extending at least partially forward; and
the seat body further defines a rod slot through which the adjustment rod extends, lateral motion of the adjustment rod being limited by the rod slot.

16. The vehicle of claim 11, further comprising:
a first spacer connected to the frame at a bottom end, the first spacer being connected to the first rail at a top end, the first spacer being selectively removable;
a second spacer connected to the frame at a bottom end, the second spacer being connected to the second rail at a top end, the second spacer being selectively removable; and wherein:
the first spacer is selectively replaceable by a third spacer of a different length;
the second spacer is selectively replaceable by a fourth spacer of a different length; and
a height of the at least one seat is altered by replacement of the first spacer by the third spacer and replacement of the second spacer by the fourth spacer.

17. The vehicle of claim 16, wherein:
a height of the end of the seat belt is altered by replacement of the first spacer by the third spacer; and
a height of the end of the female buckle receptacle is altered by replacement of the second spacer by the fourth spacer.

18. A vehicle comprising:
a frame;
a plurality of ground engaging members operatively connected to the frame;
a motor operatively connected to at least one of the ground engaging members; and
at least one seat connected to the frame and being translatable with respect to the frame between at least a forward position and a rearward position, the at least one seat including:
 a seat body defining:
  a belt aperture; and
  a buckle aperture;
   the belt aperture being disposed to one side of a centerline of the at least one seat,
   the buckle aperture being disposed to an other side of the centerline of the at least one seat; and
at least one seat belt assembly connected to the frame and including:
 a seat belt extending through the belt aperture of the seat body of the at least one seat,
 the seat belt having a first end connected to the frame, and a second end, opposite the first end of the seat belt, being connected to the frame, the second end of the seat belt being vertically higher than the first end of the seat belt;
 a male buckle connector slidably connected to the seat belt; and
 a female buckle receptacle for receiving the male buckle connector, the female buckle receptacle extending through the buckle aperture of the seat body of the at least one seat and having an end connected to the frame, the at least one seat belt assembly being operable with the at least one seat when the at least one seat is in at least both of the forward position and the rearward position.

19. The vehicle of claim 18, wherein:

the first end of the seat belt, the second end of the seat belt, and the belt aperture are disposed to a same side of the centerline of the at least one seat.

20. A vehicle comprising:

a frame;

a plurality of ground engaging members operatively connected to the frame;

a motor operatively connected to at least one of the ground engaging members; and at least one seat connected to the frame and being translatable with respect to the frame between at least a forward position and a rearward position, the at least one seat including:

a seat body defining:

a belt aperture; and a buckle aperture;

the belt aperture being disposed to one side of a centerline of the at least one seat, the buckle aperture being disposed to an other side of the centerline of the at least one seat; and at least one seat belt assembly connected to the frame and including:

a seat belt extending through the belt aperture of the seat body of the at least one seat and having an end connected to the frame;

a male buckle connector slidably connected to the seat belt; and a female buckle receptacle for receiving the male buckle connector, the female buckle receptacle extending through the buckle aperture of the seat body of the at least one seat and having an end connected to the frame, the at least one seat belt assembly being operable with the at least one seat when the at least one seat is in at least both of the forward position and the rearward position, and the at least one seat moving relative to the end of the seat belt and relative to the female buckle receptacle as the at least one seat translates between the forward position and the rearward position.

* * * * *